May 17, 1955 G. NELSON ET AL 2,708,549

CALCULATING MACHINES

Filed Dec. 9, 1943 17 Sheets-Sheet 1

INVENTORS
GUNNAR NELSON, AND
LAURENCE N. LEHMAN

BY

Carl Beust

THEIR ATTORNEY

May 17, 1955
G. NELSON ET AL
CALCULATING MACHINES
2,708,549
Filed Dec. 9, 1943
17 Sheets-Sheet 2
FIG. 2
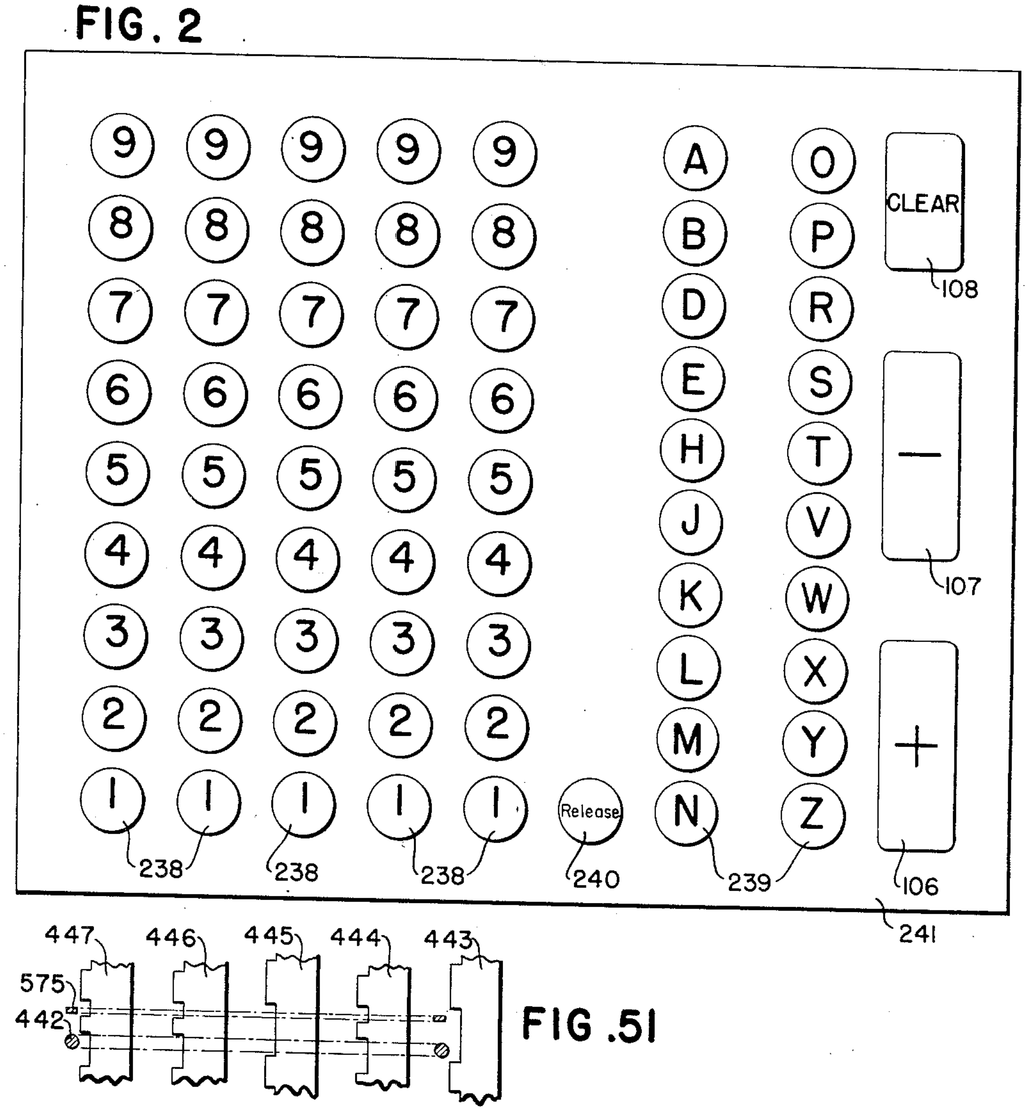
FIG. 2, FIG. 51
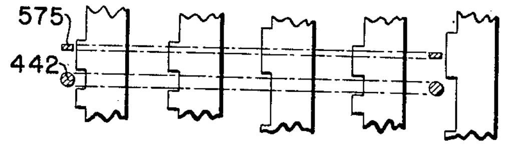
FIG. 50
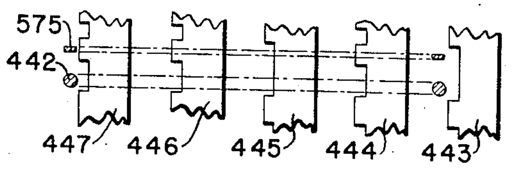
FIG. 49
INVENTORS
GUNNAR NELSON, AND
LAURENCE N. LEHMAN
BY Earl Beust
THEIR ATTORNEY May 17, 1955 G. NELSON ET AL 2,708,549

CALCULATING MACHINES

Filed Dec. 9, 1943 17 Sheets-Sheet 3

INVENTORS
GUNNAR NELSON, AND
LAURENCE N. LEHMAN

BY Earl Beust

THEIR ATTORNEY

May 17, 1955 G. NELSON ET AL 2,708,549

CALCULATING MACHINES

Filed Dec. 9, 1943 17 Sheets-Sheet 4

INVENTORS
GUNNAR NELSON, AND
LAURENCE N. LEHMAN

BY Carl Beust

THEIR ATTORNEY

May 17, 1955

G. NELSON ET AL 2,708,549

CALCULATING MACHINES

Filed Dec. 9, 1943

17 Sheets-Sheet 5

INVENTORS
GUNNAR NELSON, AND
LAURENCE N. LEHMAN

BY

Earl Beust

THEIR ATTORNEY

INVENTORS
GUNNAR NELSON, AND
LAURENCE N. LEHMAN
BY
Earl Bennett
THEIR ATTORNEY.

INVENTORS
GUNNAR NELSON, AND
LAURENCE N. LEHMAN
BY Earl Beust
THEIR ATTORNEY

May 17, 1955 G. NELSON ET AL 2,708,549

CALCULATING MACHINES

Filed Dec. 9, 1943

17 Sheets-Sheet 8

INVENTORS
GUNNAR NELSON, AND
LAURENCE N. LEHMAN
BY
Carl Beust
THEIR ATTORNEY

INVENTORS
GUNNAR NELSON, AND
LAURENCE N. LEHMAN
BY
Earl Beust
THEIR ATTORNEY

May 17, 1955

G. NELSON ET AL 2,708,549

CALCULATING MACHINES

Filed Dec. 9, 1943

17 Sheets-Sheet 10

INVENTORS
GUNNAR NELSON, AND
LAURENCE N. LEHMAN
BY
Earl Beust
THEIR ATTORNEY

May 17, 1955 G. NELSON ET AL 2,708,549

CALCULATING MACHINES

Filed Dec. 9, 1943 17 Sheets-Sheet 11

INVENTORS
GUNNAR NELSON, AND
LAURENCE N. LEHMAN
BY
Earl Beust
THEIR ATTORNEY

May 17, 1955

G. NELSON ET AL 2,708,549

CALCULATING MACHINES

Filed Dec. 9, 1943

17 Sheets-Sheet 12

INVENTORS
GUNNAR NELSON, AND
LAURENCE N. LEHMAN

BY

Earl Beust

THEIR ATTORNEY

INVENTORS
GUNNAR NELSON, AND
LAURENCE N. LEHMAN
BY
Earl Beust
THEIR ATTORNEY

INVENTORS
GUNNAR NELSON, AND
LAURENCE N. LEHMAN,
BY
Carl Benst
THEIR ATTORNEY

INVENTORS
GUNNAR NELSON, AND
LAURENCE N. LEHMAN
BY Carl Beust
THEIR ATTORNEY

INVENTORS
GUNNAR NELSON, AND
LAURENCE N. LEHMAN
BY
Carl Beust
THEIR ATTORNEY

INVENTORS
GUNNAR NELSON, AND
LAURENCE N. LEHMAN
BY Carl Beust
THEIR ATTORNEY 2,708,549

CALCULATING MACHINES

Gunnar Nelson and Laurence N. Lehman, Dayton, Ohio, assignors to The National Cash Register Company, Dayton, Ohio, a corporation of Maryland Application December 9, 1943, Serial No. 513,520

18 Claims. (Cl. 235—23)

The present invention relates to calculating machines and the like, and is particularly directed to such machines having a plurality of indicator sets for displaying numbers, and to the mechanisms for controlling the entering of numbers in said indicator sets.

One object of the present invention is to provide a calculating machine having a plurality of indicator sets for displaying numbers.

Another object is the provision of a calculating machine haivng a plurality of numeral keys, a plurality of selecting keys, and a plurality of indicator sets for displaying numbers set up on the numeral keys, said indicating sets adapted to be selected by the selecting keys to receive said numbers.

Another object of the present invention is to provide a calculating machine with a plurality of indicator sets for the displaying of numbers, said machine also including means to enter numbers in the indicator sets and means to select the indicator sets for the entering of numbers therein.

Still another object is to provide a calculating machine with a plurality of indicator sets for the displaying of numbers, said machine including a plurality of keys and associated differential mechanisms for entering numbers in the indicator sets, and means to select any one or all of the indicator sets for the entering of numbers therein.

A further object is to provide a calculating machine with a plurality of indicator sets for displaying numbers, said machine including means to enter numbers in the indicator sets, means to select the sets for the entering of numbers therein, and control means to determine whether the numbers shall be entered additively or subtractively.

A still further object is to provide a calculating machine with a plurality of indicator sets for displaying numbers, and to provide control means for the indicator sets whereby in the first part of a split-cycle operation the number in one indicator set may be subtracted from all the numbers in the other indicator sets, and in the enforced second part of said split-cycle operation the indicator sets are all restored to their original positions.

Still another object of the present invention is to provide a calculating machine with a plurality of indicator sets for displaying numbers; to provide means to enter numbers in the indicator sets and means to select the sets for the entering of numbers therein; and to further provide control means whereby numbers may be entered additively in one or all of the indicator sets, or whereby numbers may be entered subtractively in all of the indicator sets, or whereby one of the indicator sets may be zeroized and the number therein simultaneously subtracted from all the other indicator sets.

A further object is the provision of various controlling and interlocking mechanisms to enforce proper operation of the machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 2 is a diagrammatic plan view of the keyboard of the machine embodying the present invention.

Figures 14, 15, 16, 17, 18, 19:
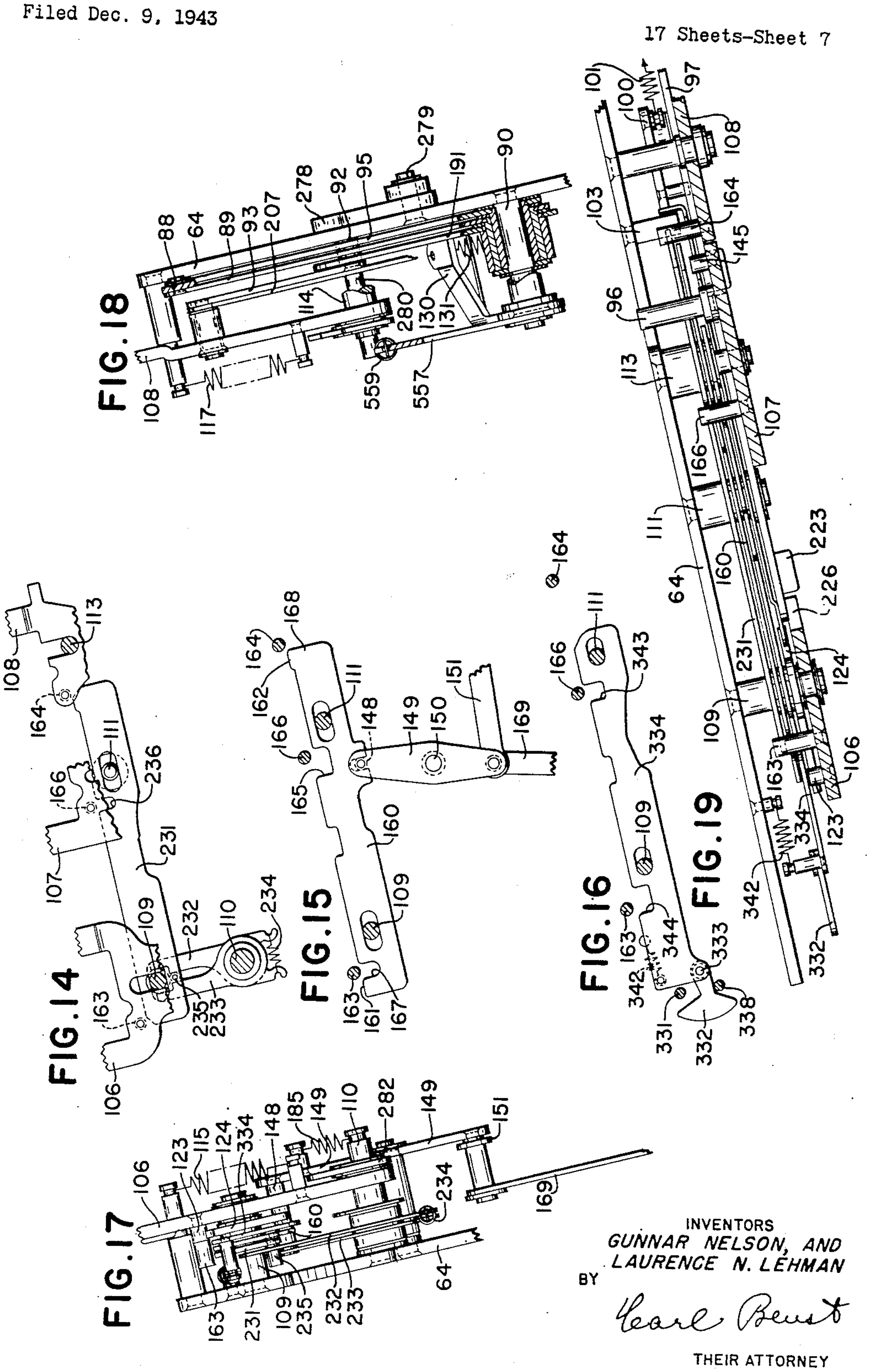

Figs. 14, 15, and 16 are detail views of the three locking bars for controlling the depression of the three machine release bars.

Fig. 17 is a front elevation of a portion of the mechanism shown in Figs. 14, 15, and 16.

Fig. 18 is a back elevation of the mechanism shown in Figs. 14, 15, and 16.

Fig. 19 is a top plan view of a portion of the mechanism shown in Figs. 14 to 18 inclusive.

Figure 20:
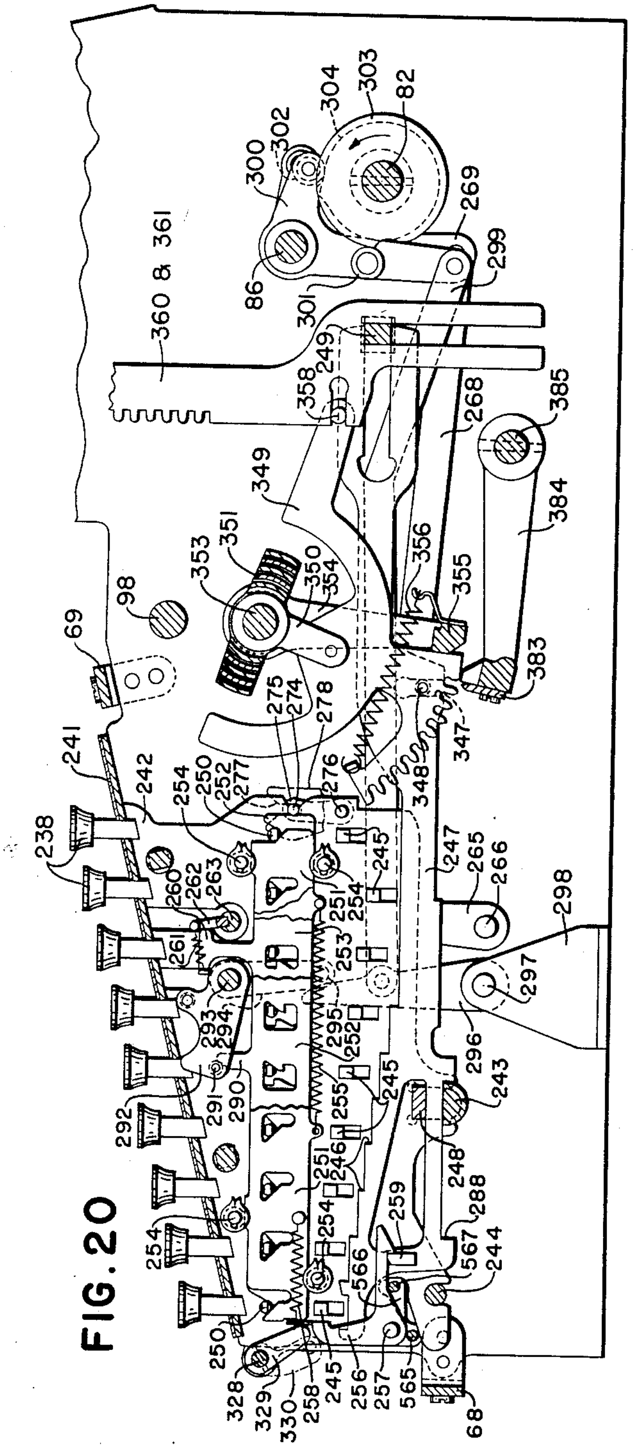

Fig. 20 is a longitudinal sectional view of the keyboard portion of the machine, taken just to the right of one of the numeral key banks.

Figure 21:
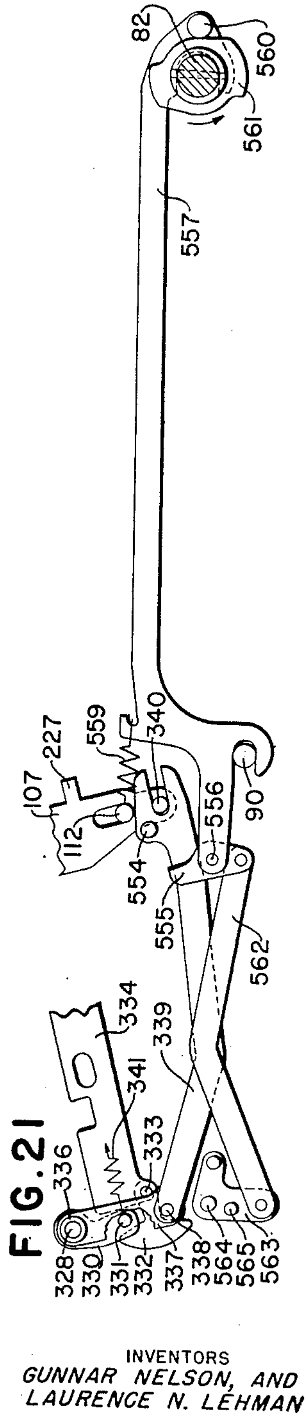

Fig. 21 is a detail view of the mechanism for throwing out the zero latches in minus operations.

Figure 22:
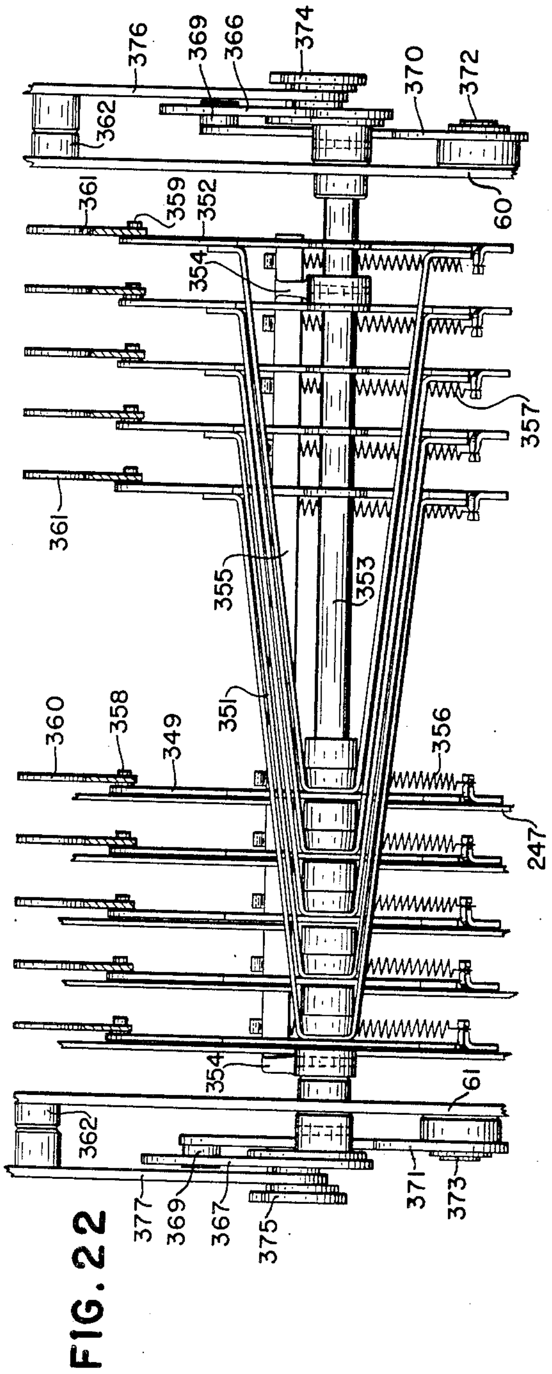

Fig. 22 is a top plan view of the reducer arms and associated mechanism for the numeral keys.

Figure 23:
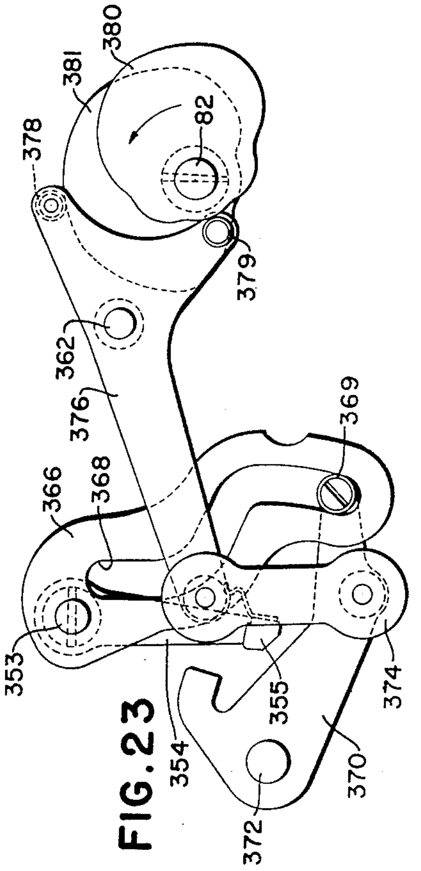

Fig. 23 is a detail view of one of the sets of cams and associated mechanism for driving the numeral key actuators.

Figures 24, 25, 26:
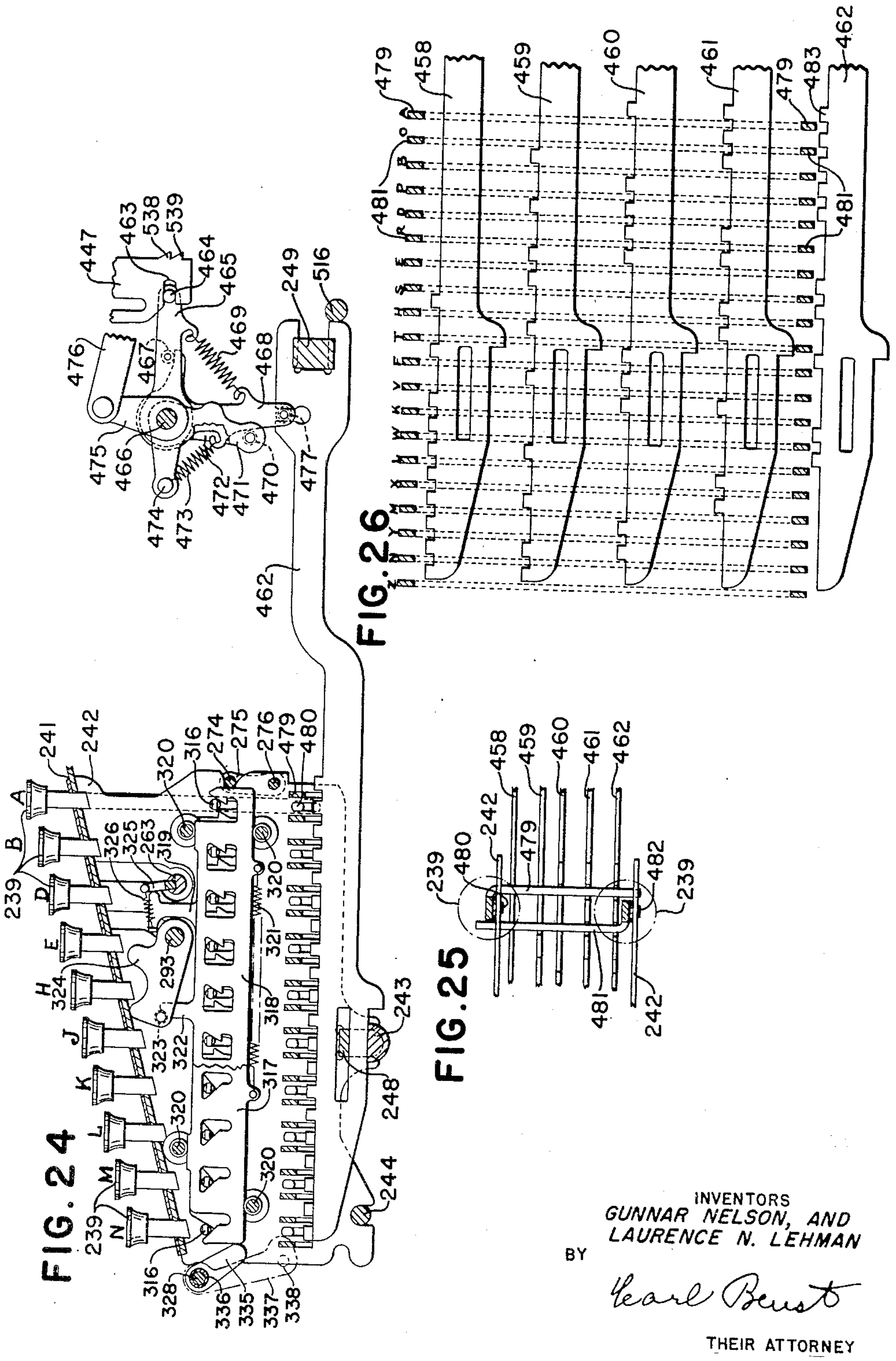

Fig. 24 is a longitudinal sectional view of the keyboard, as observed from the right, showing one of the rows of selecting keys and the selecting mechanism associated therewith.

Fig. 25 is a detail plan view showing the manner in which the selecting keys cooperate with the selecting bars.

Fig. 26 is a diagrammatic view showing how the five horizontal selecting bars are positioned by the two rows of selecting keys.

Figures 27, 28:
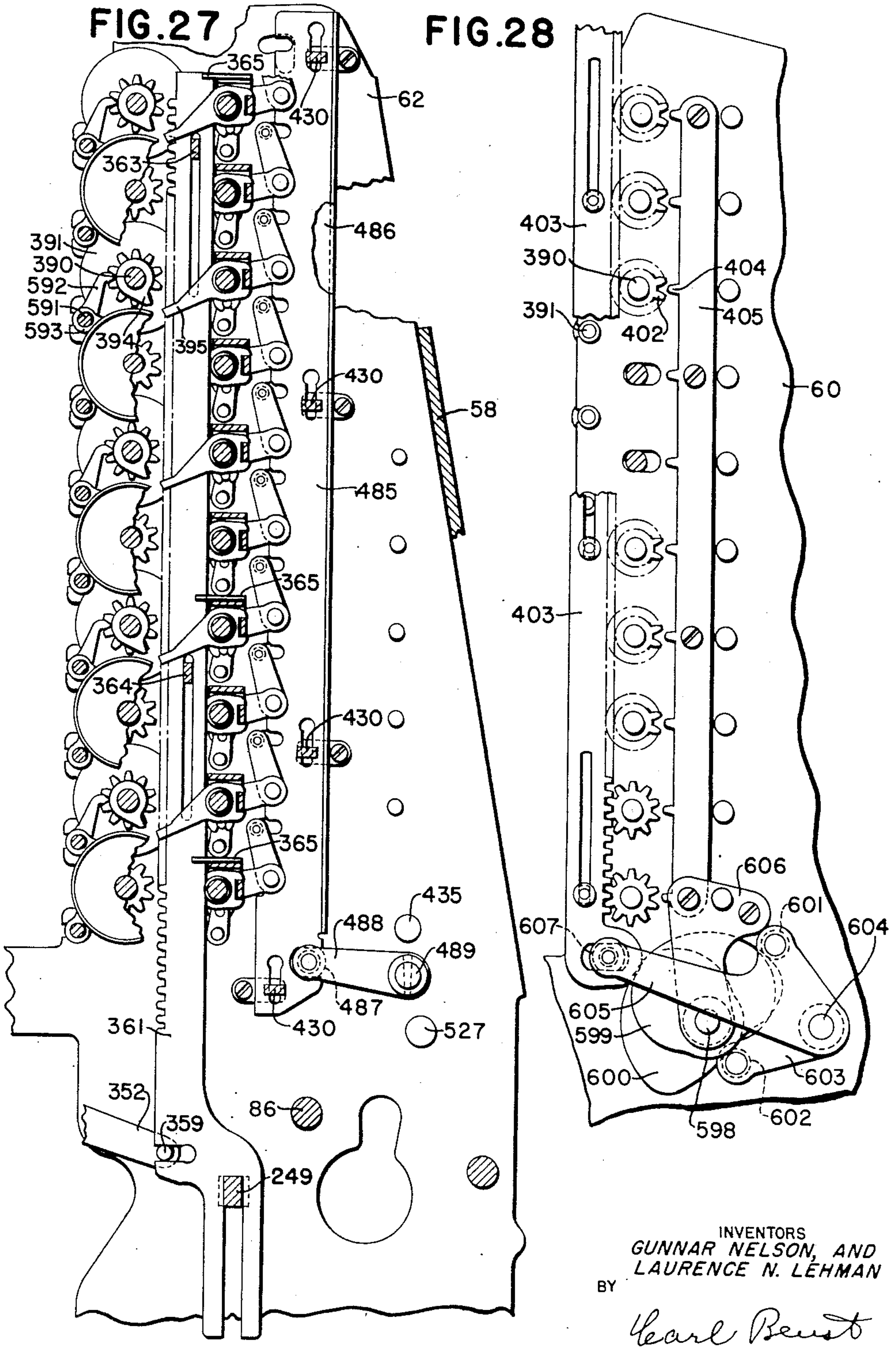

Fig. 27 is a vertical sectional view, as observed from the right, of the indicator portion of the machine, showing a portion of the actuating and selecting mechanisms for the right-hand group indicator sets.

Fig. 28 is a right side elevation showing the mechanism for clearing the right-hand group of indicator sets.

Figures 29, 30, 31, 32:
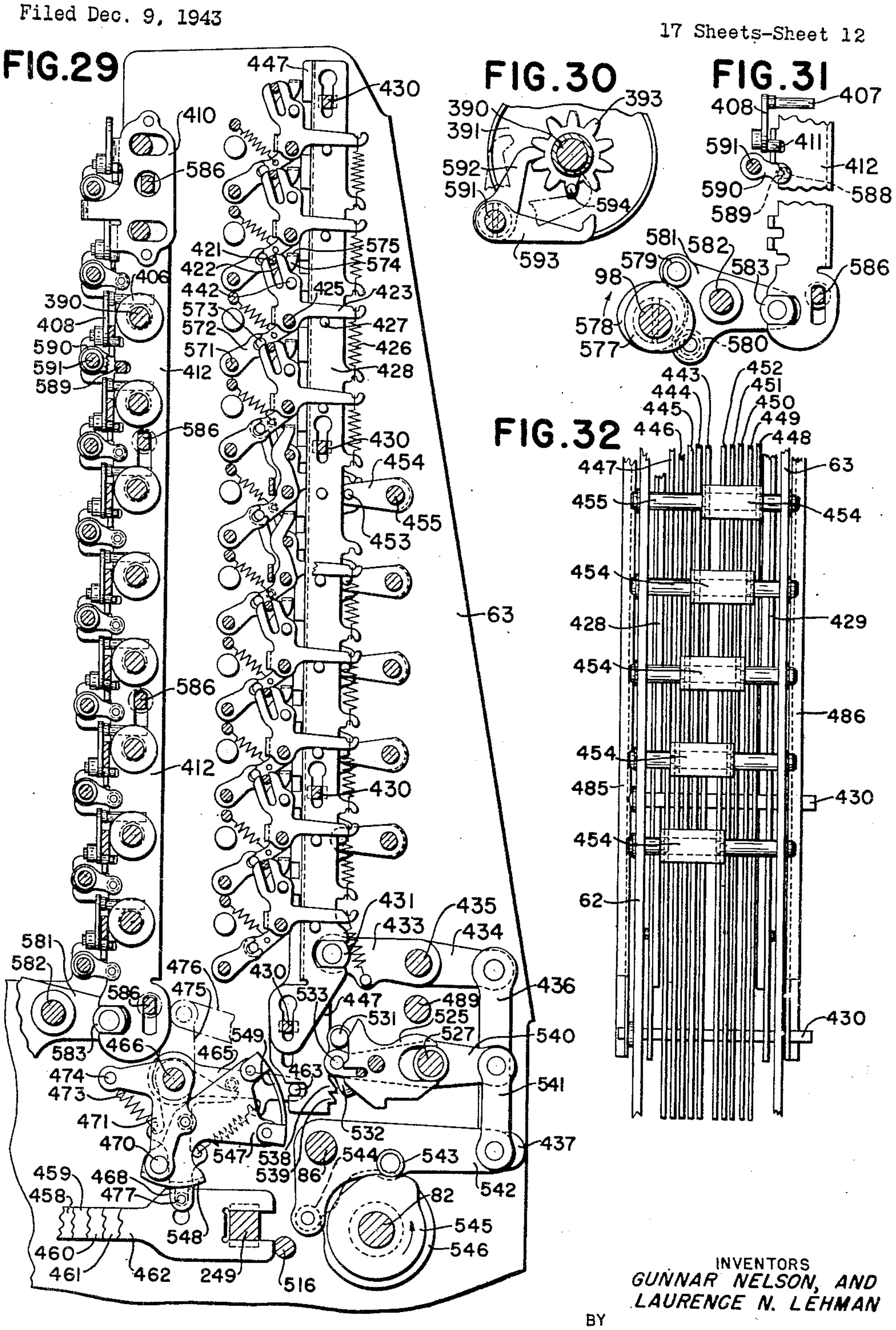

Fig. 29 is a vertical sectional view, as observed from the right, of the indicator portion of the machine, showing in particular a part of the mechanism for selecting the various indicator sets, and part of the mechanism for clearing said indicator sets.

Fig. 30 is a detail view of one of the indicator wheels and the aliner and zero stop mechanism associated therewith.

Fig. 31 is a detail view of the mechanism for laterally shifting the shafts for the various indicator sets in clearing operations, and for controlling the alining and zero stop pawls shown in Fig. 30 in clearing operations.

Fig. 32 is a fragmentary back elevation of the indicator portion of the machine, showing the vertical selecting bars for selecting the various indicator sets.

Figure 33:
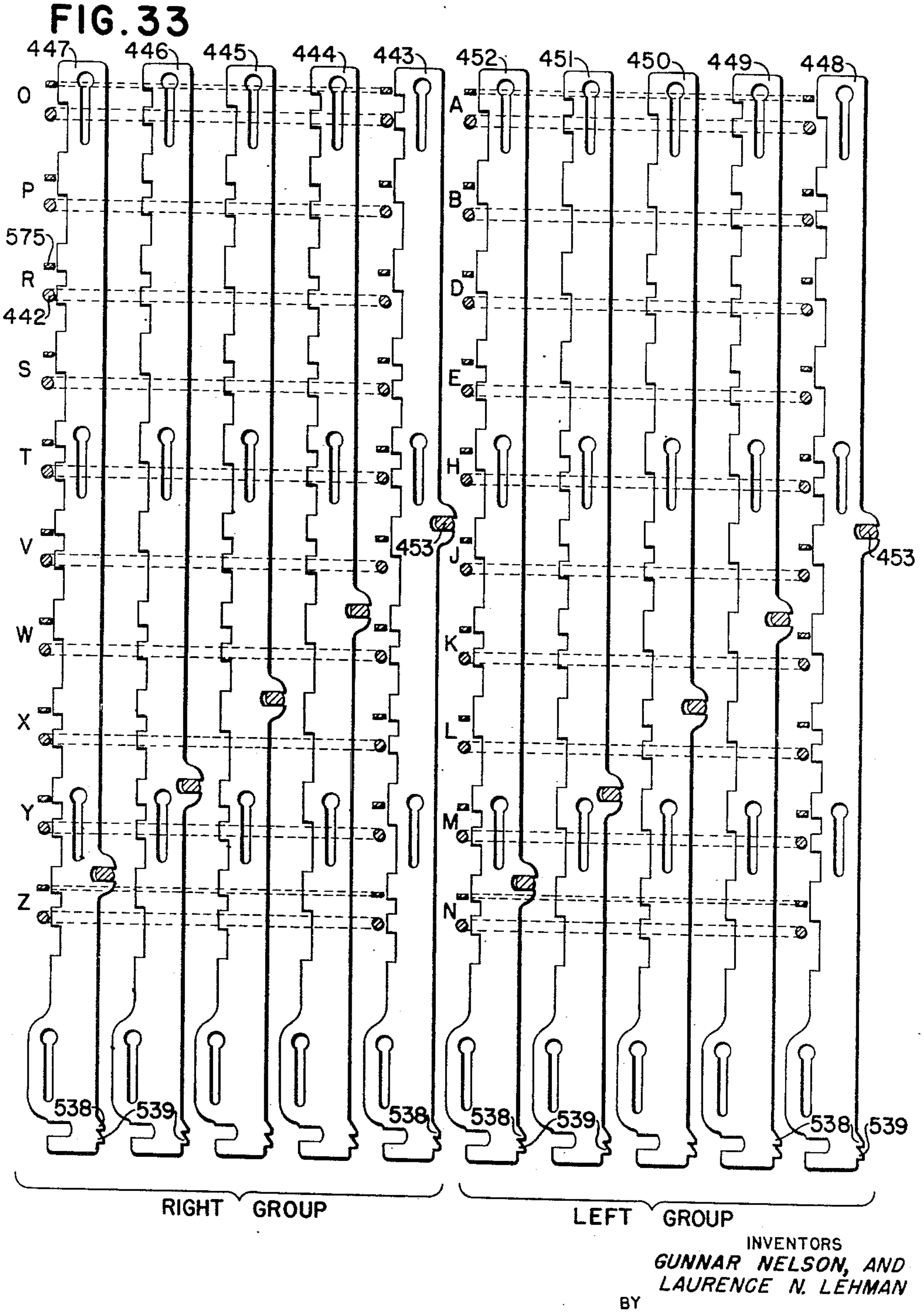

Fig. 33 is a diagrammatic view of the ten vertical selecting bars for selecting the various indicator sets for engagement with the actuator racks in various types of operations.

Figure 34:
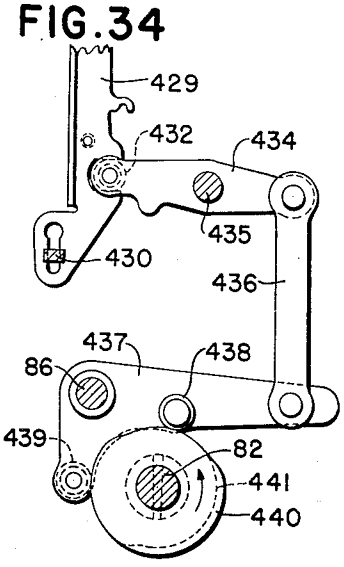

Fig. 34 is a detail view of the cam and associated mechanism for controlling the sensing movement of the selecting mechanism.

Figure 35:
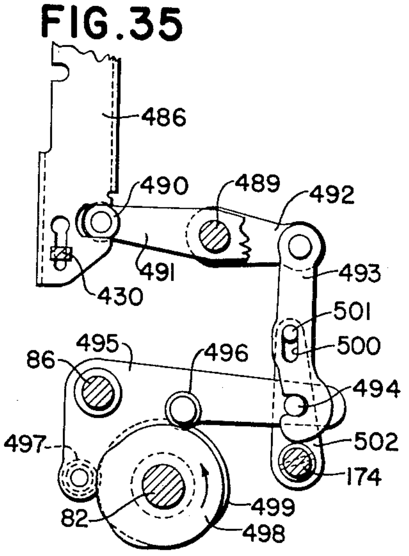

Fig. 35 is a detail view of the cam and associated mechanism for actuating the indicator set engaging mechanism in plus operations.

Figures 36, 37, 38, 39:
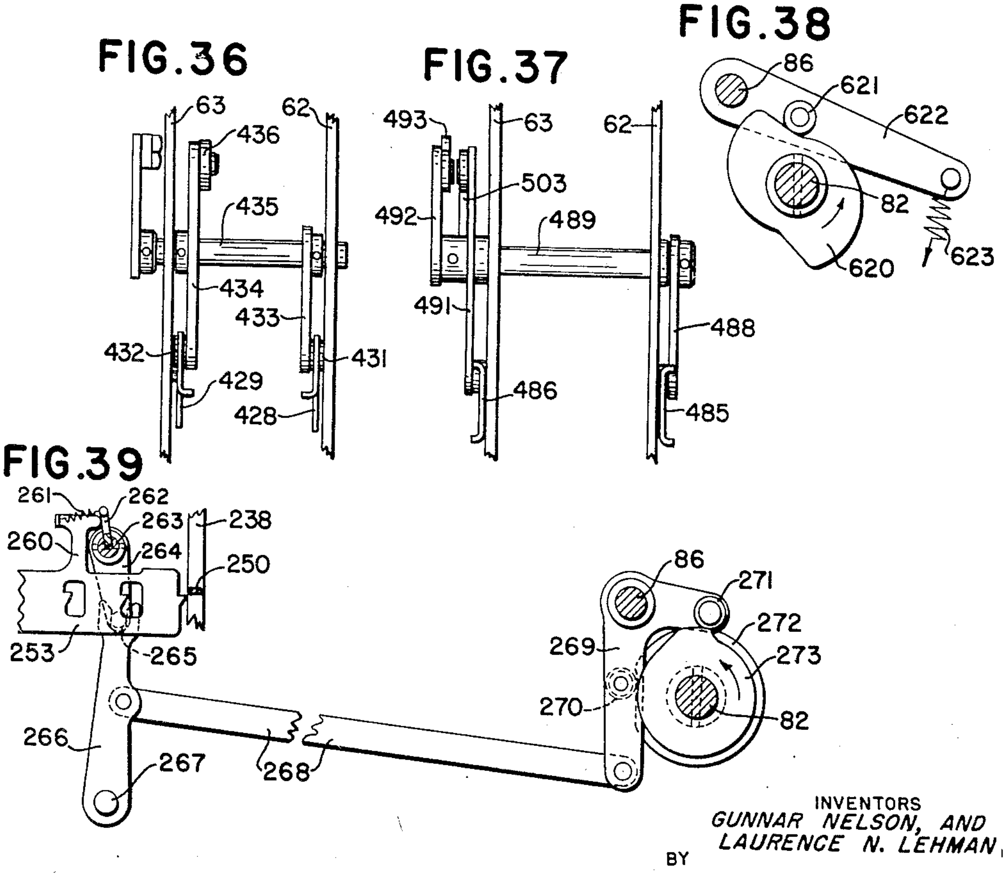

Fig. 36 is a top plan view of the mechanism shown in Fig. 34.

Fig. 37 is a top plan view of the mechanism shown in Fig. 35.

Fig. 38 is a detail view of the homing cam and associated lever for the main cam shaft.

Fig. 39 is a right side elevation of the key lock line and the cam mechanism for operating the key lock line.

Figures 40, 41, 42:
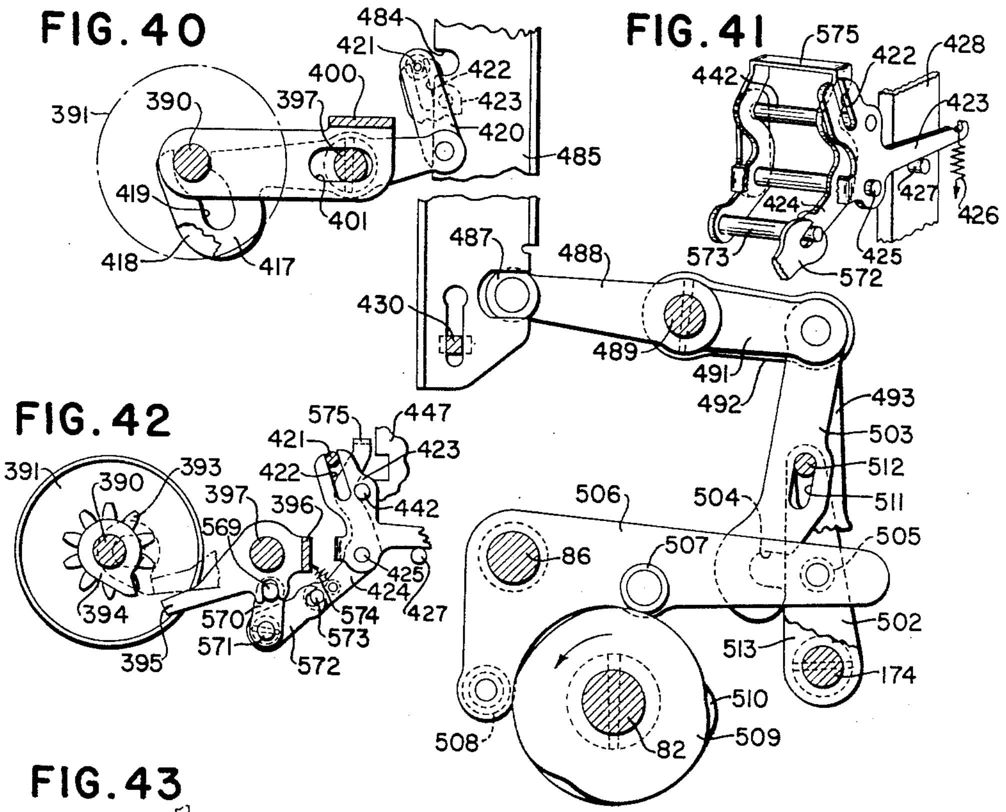

Fig. 40 is a right side elevation showing in detail the cam and associated mechanism for operating the indicator set engaging bars in minus operations.

Fig. 41 is a detail perspective view of the sensing mechanism for one of the indicator sets.

Fig. 42 is a detail view of one of the indicator wheels and the mechanism associated therewith for stopping said wheel in zero position in a certain type of minus operation.

Figures 43, 44, 45:
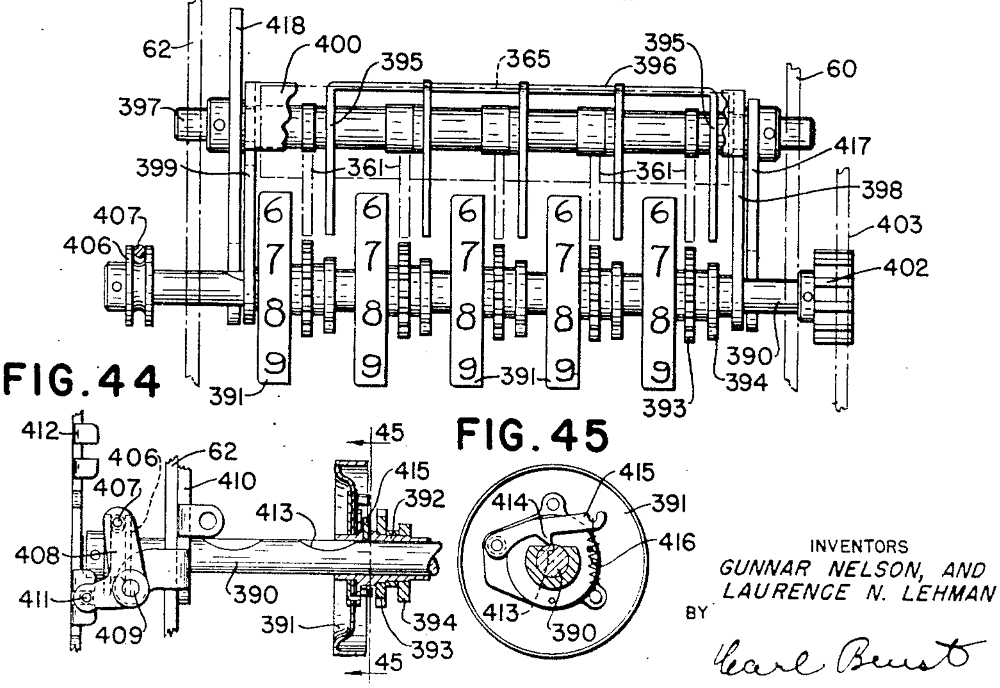

Fig. 43 is a plan view showing in detail one of the indicator sets and a portion of the mechanism associated therewith.

Fig. 44 is a detail view showing the mechanism for shifting the shaft for one of the indicator sets axially in clearing operations.

Fig. 45 is a detail view of one of the indicator wheels, showing in particular the manner in which said wheel is turned to zero in clearing operations.

Figure 46:
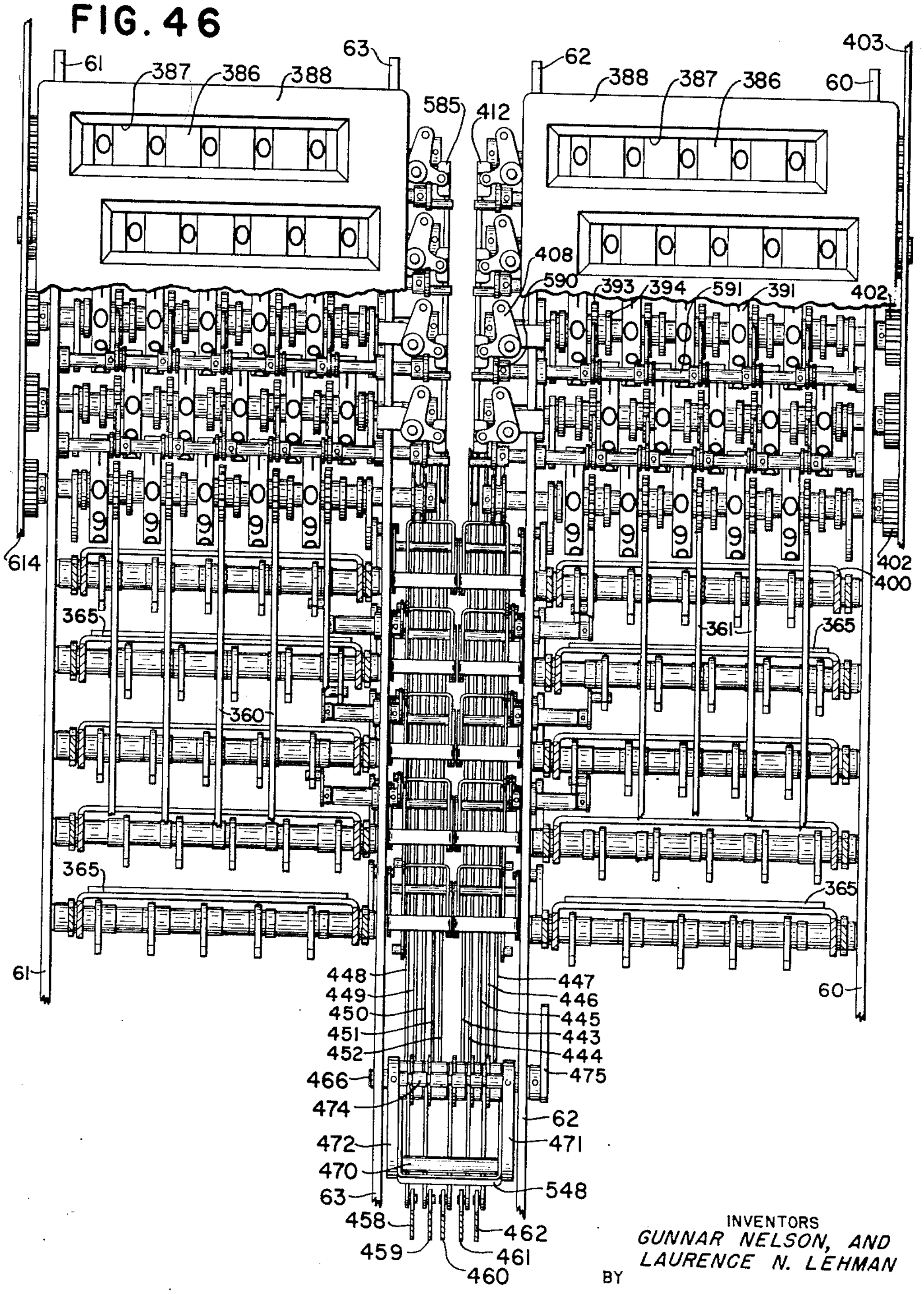

Fig. 46 is a front elevation of the indicator portion of the machine, partially broken away to better show the side-spacing of the various parts composing said indicator portion.

Figure 47:
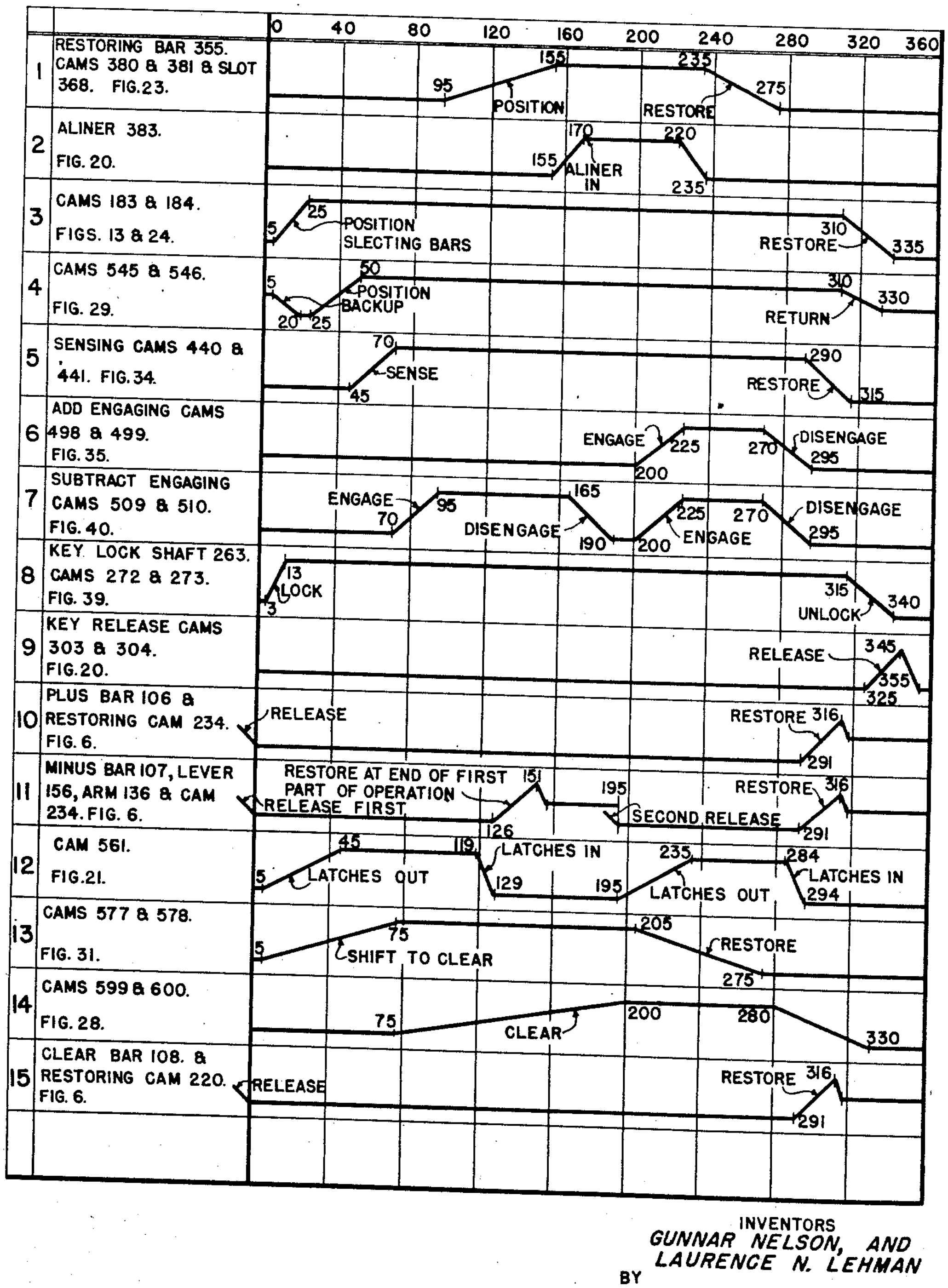

Fig. 47 is a time chart showing in graphic form the movements of the various mechanisms of the machine embodying the present invention.

Figures 6, 7, 8, 48:
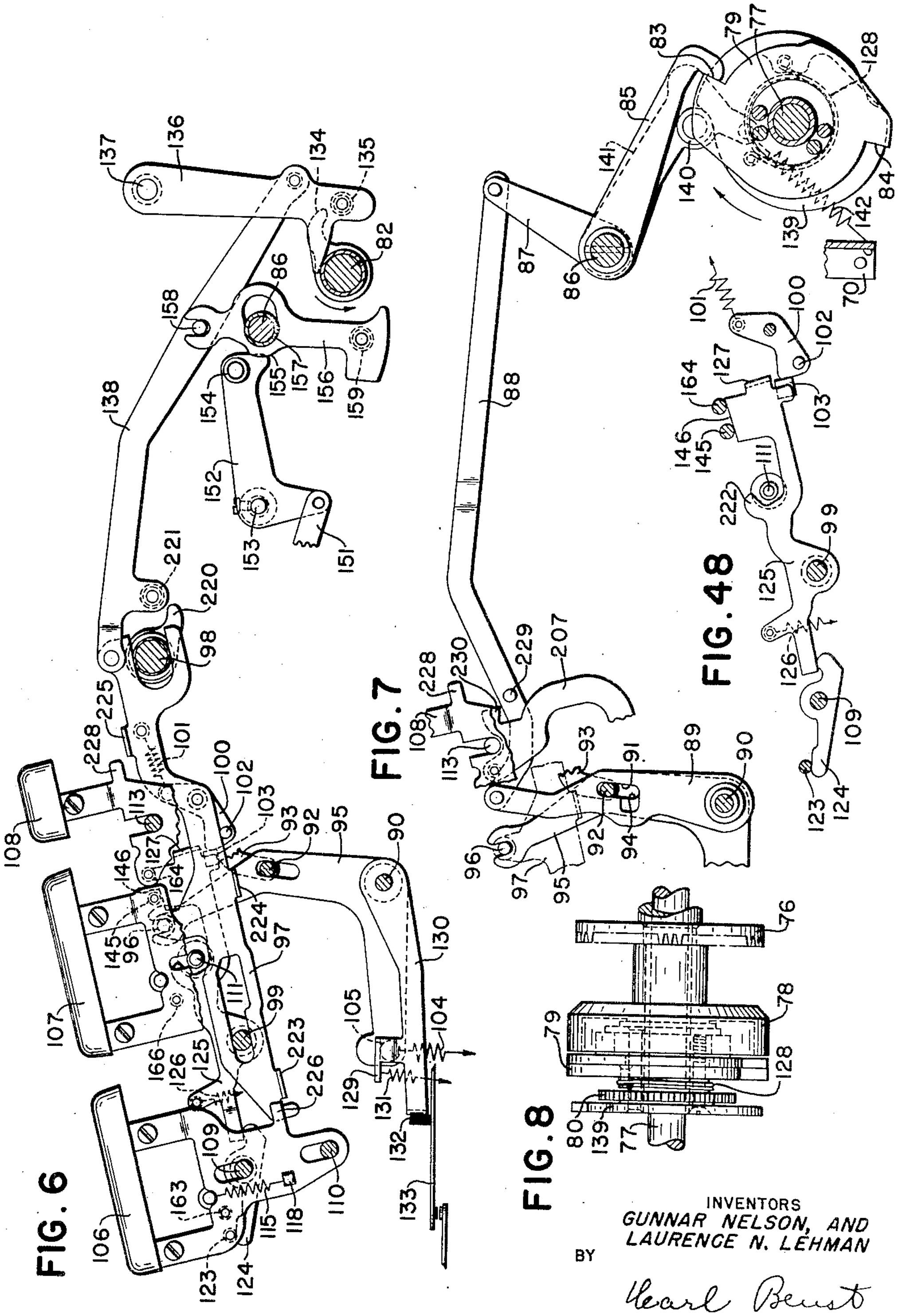
Fig. 6 is a right side elevation of the three releasing or starting bars and a portion of the machine releasing mechanism associated therewith.
Fig. 7 is a right side elevation of a portion of the machine releasing mechanism and the main clutch mechanism controlled thereby.
Fig. 8 is a detail side view of the main clutch mechanism.

Fig. 48, which is shown on the same sheet as Fig. 6, is a detail view of a portion of the releasing mechanism shown in Fig. 6 and the non-repeat mechanism associated therewith.

Figs. 49, 50, and 51, shown on the same sheet as Fig. 2, are fragmentary diagrammatic views of the five vertical selecting bars for the right-hand group of indicator sets, showing said bars in their various selecting positions.

GENERAL DESCRIPTION

The present invention is directed to a type of calculating machine often referred to as a comparator or a difference computer, said machine in its present embodiment having twenty sets of indicators, each set in turn comprising five denominational wheels having on the face thereof numerals which are visible through properly located sight apertures in the cabinet or case of the machine.

The keyboard of the machine, which is similar to that of conventional accounting machines, comprises five denominational rows of numeral keys for setting up numbers to be entered in the various indicator sets, and two rows of selecting keys, each row comprising ten keys, for selecting the various indicator sets for the entering of numbers therein. The selecting keys and the various indicator sets have similar alphabetical designations so that they may be readily identified with each other.

The keyboard also includes a Release key for releasing any depressed numeral or selecting keys. Likewise, the keyboard includes three machine release or starting bars; namely, a Plus bar for initiating plus operations, a Minus bar for initiating minus operations, and a Clearing bar for initiating operations in which all of the indicator sets are simultaneously cleared or zeroized.

The keyboard is arranged so that it may be conveniently manipulated by the operator, and the twenty indicator sets are arranged in two vertical columns of ten sets each just beyond the keyboard in position to be conveniently read by the operator.

The construction of the numeral and selecting key banks is similar in many respects to the main keyboard of the machine disclosed in the United States Patent No. 2,189,851, issued February 13, 1940, to Paul H. Williams et al. Likewise, the differential mechanism associated with the numeral and selecting key banks of the present machine is similar in many respects to that disclosed in the above patent, to which reference may be had for a complete disclosure of mechanism not described in detail herein.

The depressed numeral keys in each of the five denominational rows position corresponding horizontal actuators, which in turn, through a reducer arm mechanism, position corresponding vertical actuator racks, there being two such racks for each order of numeral keys, so that the value of the numerals set up on the numeral keys will be transmitted to the selected indicator set in either of the two vertical columns. The two rows of indicator set selecting keys cooperate with and position five horizontal selecting bars, each of which is operatively connected to two corresponding vertical selecting bars, one each for the two vertical columns of indicator sets. The horizontal selecting bars are positioned under influence of the selecting keys, and this positioning is transmitted to the corresponding vertical selecting bars. The vertical selecting bars have control surfaces on one edge thereof, formed of high and low portions, which cooperate with sensing mechanisms for each of the indicator sets, to cause the indicator set corresponding to the depressed selecting key to be engaged with the vertical actuator racks.

After the vertical selecting bars have been positioned as explained above, the sensing mechanism senses the control surfaces of said bars and causes the engaging mechanism for the indicator set corresponding to the depressed selecting key to be engaged with the corresponding engaging bar, there being one such bar for each of the two vertical columns of indicator sets.

When the Plus release bar is used to initiate machine operations, the engaging bars function according to adding time to cause the number set up on the numeral keys to be entered additively in the wheels of the selected indicator set. The wheels of the different indicator sets have no transfer mechanisms for transferring tens digits from lower to higher denominational orders. Therefore said indicator sets are not accumulative in action and do not give a true reading when the wheels thereof are moved beyond their individual capacity in either plus or minus operations.

The present machine is not arranged for the entering of minus numbers in each of the indicator sets under influence of the selecting keys, in the manner explained in connection with the entering of plus numbers in said indicator sets. However, numbers may be entered positively or negatively in all of the indicator sets in a single plus or minus operation of the machine by not depressing any of the selecting keys. In this case, mechanism becomes effective which moves the vertical selecting bars for the indicator sets to a position in which all the sensing mechanisms for the various indicator sets cause the engaging mechanism for said sets to be connected to the vertical engaging bars. Therefore, in either plus or minus operations in which no selecting key is depressed, the number set up on the numeral keys will be entered in each and every one of the indicator sets.

In addition to the types of operations referred to above, there is one operation in which any selected one of the indicator sets may be sub-totaled or zeroized and the number thereon subtracted from all the other indicator sets. This type of operation is known as a "difference computing operation," and the indicator set which it is desired to zeroize is selected by depression of the corresponding one of the selecting keys, after which the Minus release bar is depressed to initiate machine operation.

As previously explained, the Minus release bar controls mechanism which causes the indicator set engaging bars to move in subtract time, and during machine operation the selecting bars receive a primary movement during which they are positioned under influence of the depressed starting key. In addition to the primary movement of the selecting bars, depression of the Minus release bar controls mechanism which causes the selecting bars to receive a secondary movement to cause all of the indicator sets to be connected with the engaging mechanism and to cause the zero stop pawls for the indicator set corresponding to the depressed selecting key to be moved into position to cooperate with the teeth of the stop plates on the wheels of said selected indicator set to stop said wheels in zero position. Subsequent movement of the engaging bars in subtract time causes the wheels of all the indicator sets to be connected to the actuator racks in subtract time, to cause the wheels of said selected indicator set to be reversely rotated to zero position and to simultaneously cause the wheels of all the other indicator sets to be reversely rotated a like distance to subtract therefrom the number on the wheels of said selected indicator set.

At this stage of the operation, the machine comes to rest to give the operator time to view the indicator sets in their new positions, after which the difference computing operation may be completed by the operator again depressing the Minus release bar, and in the second portion of the split-cycle operation, the indicator sets, including the one selected for zeroizing, are all restored to their original positions.

A clearing operation in which all of the indicator sets are simultaneously cleared or turned to zero is initiated by depression of the Clear release bar. Depression of the Clear release bar controls mechanism which causes all of the shafts for the different indicator sets to be shifted axially to aline clearing notches in said shafts with the clearing pawls carried by each of the indicator wheels. After this, the shafts are rotated to cause the notches therein, in cooperation with the pawls, to turn the wheels of the indicator sets to zero. During clearing operations, zero stop pawls for each of the indicator wheels are moved into the paths of zero stop studs carried by each of said wheels, to insure that said indicator wheels do not move beyond zero position. Operating in conjunction with the zero stop pawls is an aliner pawl for each indicator wheel, which cooperates with the teeth of an actuating gear secured to each of said wheels, when the indicator sets are in normal or disengaged position, to accurately aline the numerals on said wheels with the sight openings in the front of the cabinet.

When the indicator sets are in disengaged positions, clearing gears secured to each end of each of the indicator shafts are in engagement with the corresponding clearing rack and remain thus engaged in clearing operations, as no shifting of the indicator wheels into engagement with the actuator racks occurs in such operations. Inasmuch as there is no engaging movement of the indicator sets in clearing operations, it is necessary to disengage the aliners from the teeth of the actuating gears during such operations, and, as said aliners and the zero stop pawls are secured on the same shaft and are operated by the same mechanism, said aliners are moved to ineffective positions at the same time the zero stop pawls are moved to effective positions.

As explained above, a difference computing operation consists of a split-cycle operation, or an interrupted operation, during the first portion of which the selected indicator set is turned to zero and the number thereon is simultaneously subtracted from all the other indicator sets. After this, operation of the machine ceases in order to provide time for the operator to read the various indicator sets. In such operations, locking mechanisms enforce proper operation of the machine, and, after the first portion of the split-cycle operation has been performed, it is impossible to initiate any other type of operation, as the Plus release bar and the Clear release bar and the numeral keys and the selecting keys are locked against depression. Therefore it is possible only to depress the Minus release bar, which initiates the last portion of the difference computing operation, in which all of the indicator sets are restored to their original positions.

The indicator clearing mechanism is not driven through the main clutch of the machine, but is driven through an auxiliary clutch mechanism, which is effectuated upon depression of the Clear release bar.

Various other locking mechanisms, which will be explained in detail later herein, are provided for enforcing proper operation of the machine.

In the ensuing pages, mechanism explained in general above, which is pertinent to the present invention, will be described in detail.

DETAILED DESCRIPTION

*Framework*

Figure 1:
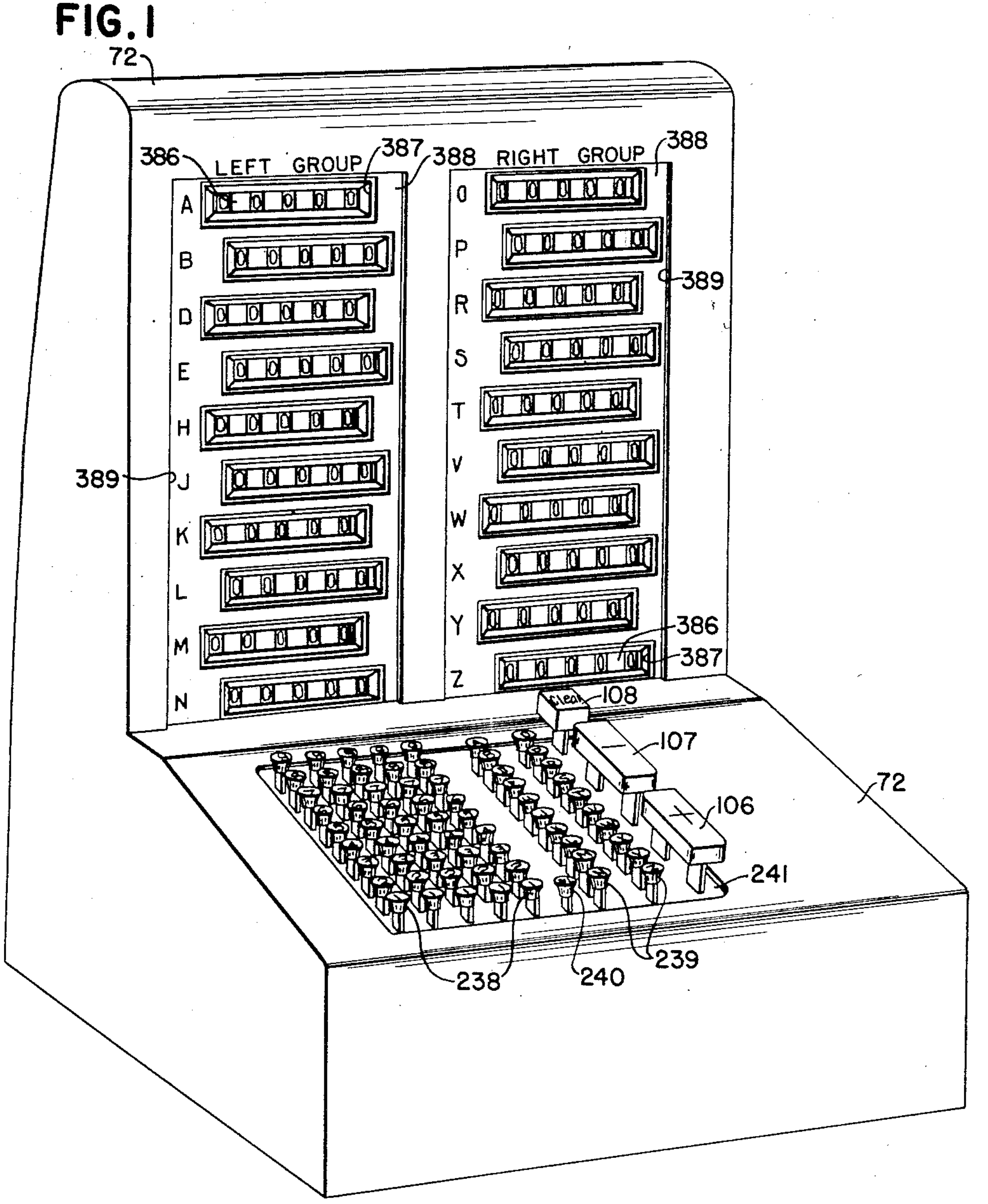
Fig. 1 is a perspective view of the machine embodying the present invention.

The framework of the machine embodying the present invention includes main outer frames 60 and 61 (Figs. 3, 4, and 46), inner frames 62 and 63, and a release bar support frame 64, which is in alinement with the frame 62. The frames 60, 61, and 64 are secured by brackets 65 and the frames 62 and 63 are secured by brackets 66 to a machine base 67, which, together with tie bars 68 and 69, plates 70 and 71, and a back plate 58 (Fig. 27), secure said frames in properly spaced relationship to each other. The framework described above supports all the mechanism of the machine, and said framework and said mechanism are enclosed in a suitable case or cabinet 72 (Fig. 1), which is secured to the base 67.

*Machine operating and releasing mechanisms*

The mechanism of the machine is driven by an electric motor 73 (Figs. 3 and 4) secured to a rod 59, supported by the frames 60 and 64, and to the cross plate 71, the output shaft of said motor having secured thereon a gear 206 connected by a pin and clutch cut to the forward end of a shaft 74, the rearward end of which is journaled in the plate 70. Secured on the rearward end of the shaft 74 is a pinion 75 meshing with a face or crown gear 76 free on a shaft 77 supported by the frames 60 and 62, said crown gear being integral with a clutch driving member 78 also free on said shaft 77.

Cooperating with the clutch driving member 78 (Figs. 3 and 4) is a clutch driven member 79 having integral therewith a gear 80, which meshes with a gear 81 secured on a main cam shaft 82 journaled in the frames 60, 61, and 62.

The clutch mechanism, including the driving member 78 and the driven member 79, is similar in every respect to the clutch mechanism disclosed in the United States Patent No. 2,060,249, issued November 10, 1936, to H. B. Scott, and, in view of this disclosure, it is believed unnecessary to describe the clutch mechanism in detail.

Figures 9, 10, 11, 12, 13:
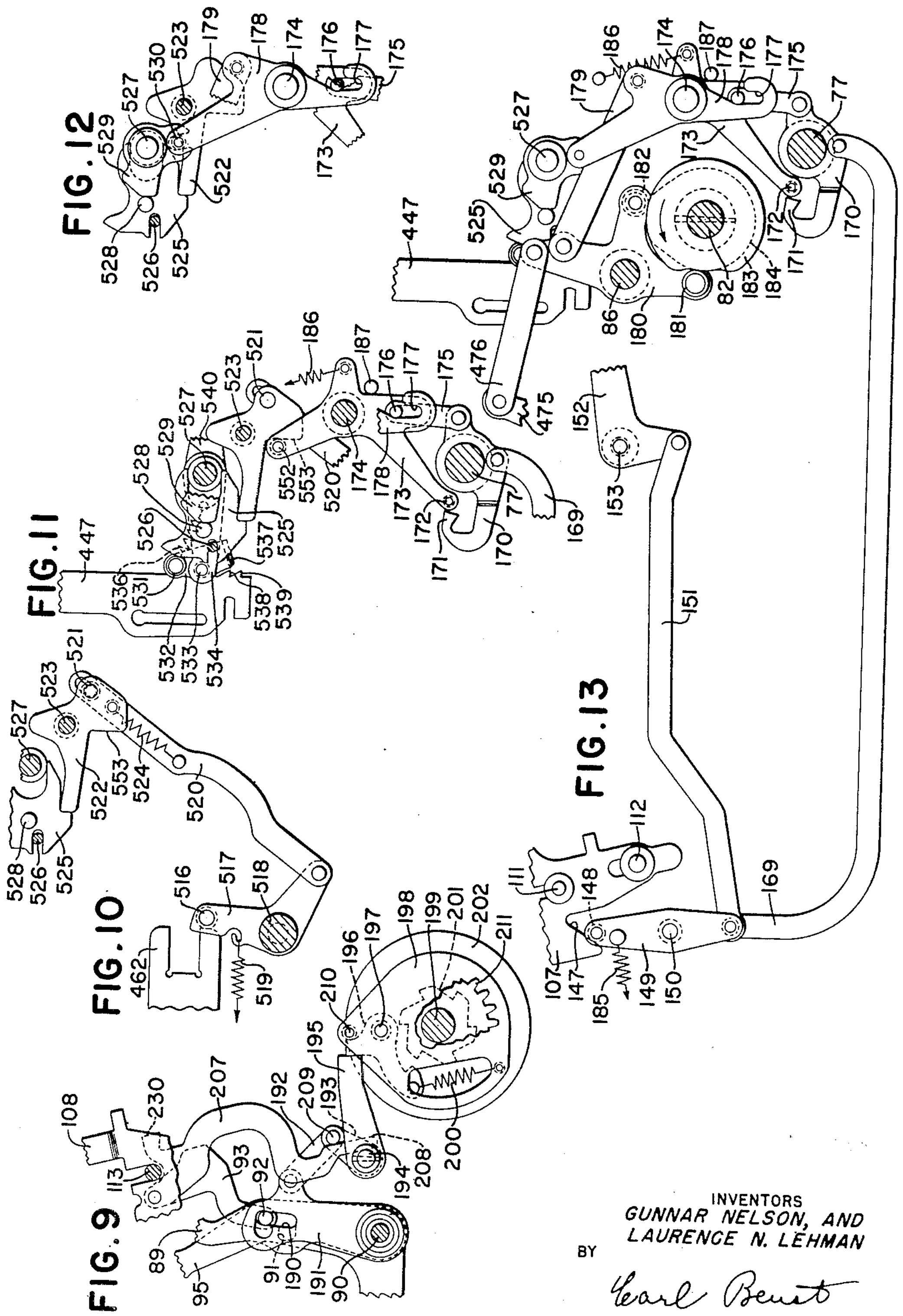
Fig. 9 is a detail view of the reset or clearing clutch mechanism and a portion of the controlling mechanism associated therewith.
Fig. 10 is a detail view of the mechanism for releasing all the vertical selecting bars for upward selecting movement when no selecting key is depressed.
Fig. 11 is a detail view of a portion of the mechanism for controlling the upward selecting movement of the selecting bars.
Fig. 12 is a detail view of a portion of the mechanism shown in Figs. 11 and 13.
Fig. 13 is a detail view of the mechanism for controlling the upward selecting movement of the selecting bars in minus operations.

The clutch driven member 79 (Fig. 7) has abutments or stop shoulders 83 and 84 adapted to be engaged by a stopping projection on a clutch stop arm 85 secured, by a hub free on a rod 86 supported by the frames 60, 61, 62, and 63, to a crank 87. The crank 87 is pivotally connected to one end of a link 88, the other end of which is pivotally connected to the upper end of an arm 89 free on a stud 90 in the frame 64. The arm 89 has therein an L-shaped slot 91, through which extends a stud 92 in the lower end of a link 93, the upper end of which is pivotally connected to the Clear release bar 108 (Fig. 9). The stud 92 passes through a slot 94 in a clutch operating lever 95 slotted at its upper end to receive a stud 96 (Figs. 4, 6, and 7) in a clutch control slide 97. The slide 97 is mounted for angular shifting movement by means of parallel slots therein in cooperation with a stud 99 secured in the frame 64, and in cooperation with a reset cam shaft 98 journaled in the frames 60, 61, 62, and 63. The slide 97 has pivotally mounted thereon a stop pawl 100 urged clockwise by a spring 101 to normally maintain a stud 102 carried thereby in contact with the bottom surface of said slide 97 and to normally maintain a nose on said pawl in the path of a square stop stud 103 (see also Fig. 48) secured in the frame 64. A comparatively strong spring 104 (Figs. 4 and 6), tensioned between a stud 105 and an extension of the lever 95 and a stud in the frame 64, urges said lever 95 counter-clockwise, said lever in turn urging the slide 97 forwardly to normally maintain the nose of the pawl 100 in contact with the stop stud 103.

The present machine is provided with three machine release or starting bars; namely, a Plus release bar 106 (Figs. 2, 4, and 6), a Minus release bar 107, and a Clear release bar 108, said bars 106 and 107 controlling the main clutch mechanism shown in Fig. 7 and described above, while the Clear bar 108 does not cooperate with the main clutch mechanism but actuates an auxiliary clutch mechanism which drives the clearing mechanism, as will be explained later.

The Plus bar 106 is depressibly mounted by means of parallel slots therein in cooperation with stationary studs 109 and 110 secured in the frame 64 (see also Fig. 19). The Minus bar 107 is depressibly mounted by means of parallel slots therein in cooperation with studs 111 and 112 secured in the frame 64, and the Clear bar 108 is depressibly mounted by means of parallel slots therein in cooperation with studs 113 and 114 also secured in the frame 64. The release bars 106, 107, and 108 are urged upwardly and are normally maintained in undepressed positions by springs 115, 116, and 117 (Fig. 4) tensioned, respectively, between studs 118, 119, and 120 in said bars 106, 107, and 108 and fixed studs in the frame 64.

*Plus release bar*

Depression of the Plus release bar 106 (Figs. 4, 6, and 48) causes a stud 123 carried thereby to engage a lever 124 free on the stud 109 and rock said lever counter-clockwise. In rocking counter-clockwise, the lever 124 engages and rocks another lever 125, pivoted on the stud 99, clockwise against the action of a spring 126. Clockwise movement of the lever 125 causes a bent-over portion 127 on the rearward end thereof to engage the nose of the pawl 100 and rock said pawl counter-clockwise, against the action of the spring 101, out of engagement with the square stud 103, to release the slide 97 and the lever 95 to the action of the spring 104, which immediately rocks said parts forwardly and counter-clockwise, respectively. Counter-clockwise movement of the lever 95, through the stud 92 (Figs. 6 and 7), which is in its upward position as shown here, carries the arm 89 counter-clockwise in unison with it, which, through the link 88, rocks the crank 87 and the clutch arm 85 also counter-clockwise. Counter-clockwise movement of the arm 85 disengages the stopping projection thereon from the shoulder 83 to release the clutch mechanism to the action of a torsion spring 128, which immediately couples the driven member 79 to the driving member 78 to connect the main cam shaft 82 to the operating motor 73. Counter-clockwise movement of the lever 95 (Figs. 4 and 6) withdraws the stud 105 from a bent-over portion 129 of a switch arm 130 free on the stud 90, permitting a spring 131 to carry said arm counter-clockwise in unison with said lever 95. Counter-clockwise movement of the arm 130 causes a switch-operating block 132 of dielectric material, carried thereby, to engage and close the contact points of a switch 133 for the motor 73 to energize said motor, whereupon the shaft 74 drives the clutch mechanism, and said clutch mechanism in turn drives the main cam shaft 82 in a counter-clockwise direction, as viewed in Fig. 4.

One clockwise revolution of the clutch mechanism and one counter-clockwise revolution of the main cam shaft 82 (Fig. 4) are required for each machine operation. When the main cam shaft 82 nears the terminus of its counter-clockwise revolution, a restoring cam 134 (Figs. 3, 4 and 6), functioning according to the time given in space 10 of the time chart, Fig. 47, engages a roller 135 mounted on the lower end of an arm 136 free on a stud 137 in the frame 62 and rocks said arm counter-clockwise. Counter-clockwise movement of the arm 136, through a link 138, which connects said arm to the slide 97, restores said slide rearwardly, and said slide in turn restores the lever 95 and the arm 89 clockwise in unison therewith. This movement of the arm 89, through the link 88 and the crank 87, restores the clutch arm 85 clockwise to move the stopping projection thereon into the path of the shoulder 83 to terminate movement of the clutch driven member 79 and the main cam shaft 82 after said parts have completed one revolution. Clockwise restoring movement of the lever 95 (Fig. 6) causes the stud 105, in cooperation with the bent-over portion 129, to rock the switch arm 130 clockwise in unison therewith against the action of the spring 131 to open the switch 133 to deenergize the motor at substantially the same time the clutch mechanism is disengaged.

A homing cam 139 (Figs. 3, 7, and 8) integral with the gear 80 and the clutch driven member 79, in cooperation with a roller 140 carried by an arm 141 free on the rod 86 and urged clockwise by a spring 142, assists in disengaging the clutch mechanism and, in cooperation with the arm 85 and the shoulder 83, maintains the driven portion of the clutch in home or disengaged position, as shown in Fig. 7.

*Minus release bar*

Depression of the Minus release bar 107 (Figs. 3, 4, 6, and 48), to initiate a minus operation, causes a stud 145 carried thereby, in cooperation with a surface 146 on the lever 125, to rock said lever clockwise, against the action of the spring 126, causing the bent-over portion 127 to engage and rock the pawl 100 out of engagement with the square stud 103 to release the slide 97 for forward movement, to initiate machine operation in exactly the same manner as explained in connection with the Plus bar 106.

As explained previously, a minus operation is a split-cycle operation consisting of a first part and a second part, and the machine comes to rest, after the first part of the operation has been performed, to permit the operator to read the indicator sets to observe the results thereon. To complete the operation, the operator depresses the Minus bar 107 a second time, and the machine completes the second part of the minus operation to restore all the indicator sets to their original positions.

Depression of the Minus release bar 107 (Figs. 4, 6, and 13) causes an angular camming surface 147 thereon, in cooperation with a stud 148 in the upper end of a lever 149 free on a stud 150 in the frame 64, to rock said lever clockwise. Clockwise movement of the lever 149, through a link 151 pivotally connecting said lever to an arm 152 secured on a stud 153 journaled in a hub secured in the frame 62, rocks said arm 152 clockwise in unison therewith. Clockwise movement of the arm 152 (Fig. 6) moves a roller 154 carried thereby into the path of an enlarged surface 155 on a restoring lever 156 slotted to embrace a collar 157 free on the rod 86. The upper end of the lever 156 is slotted to embrace a stud 158 in the link 138, whereupon forward movement of said link and the slide 97, when the Minus release bar is depressed, rocks the lever 156 counter-clockwise to move a roller 159, mounted on the lower end thereof, into the path of the restoring cam 134.

After the machine has completed the first part of the minus operation and the selected indicator set has been zeroized and the number thereon subtracted from the other indicator sets, as will be explained later, the cam 134 engages the roller 159 and, due to the fulcrum point formed by the roller 154, rocks the lever 156 clockwise to shift the link 138 and the slide 97 rearwardly to restore the lever 95 and the arm 89 clockwise. This movement of the arm 89, through the link 88 (Fig. 7), moves the clutch arm 85 into the path of the shoulder 84 to disengage the clutch mechanism after the first part of the minus operation has been completed.

The timing of the cam 134 in relation to the lever 156 in the first part of minus operations, and in relation to the arm 136 in the second or last part of minus operations, is given in space 11 of the time chart, Fig. 47.

To insure proper operation of the machine, various interlocks are provided between the three release bars. These locking mechanisms will be explained in connection with the explanation of the release bars with which they are chiefly associated.

The stud 148 in the upper end of the lever 149 (Figs. 4, 13, and 15) engages a slot in the lower edge of a control bar 160 slidably mounted by means of parallel slots therein in cooperation with the studs 109 and 111.

Clockwise movement of the lever 149, when the Minus bar 107 is depressed, causes the stud 148 to shift the bar 160 rearwardly to move obstructing surfaces 161 and 162 on the upper edge thereof into the paths of studs 163 and 164 secured, respectively, to the Plus release bar 106 and to the Clear release bar 108 to lock said release bars against depression during minus operations. A clearance notch 165 in the upper edge of the bar 160 provides clearance for a stud 166 in the Minus bar 107, so that the rearward locking movement of said bar 160 will not interfere with the depression of the Minus bar 107.

In plus operations, depression of the Plus bar 106 moves the stud 163 into a notch 167 in the control bar 160 to obstruct movement of said bar, the lever 149, and connected parts, including the Minus bar 107. Likewise, depression of the Clear reset bar 108 moves the stud 164 into the path of the rearward end 168 of the control bar 160 to obstruct rearward locking movement of said bar 160 when said Clear bar is depressed.

Mechanism is provided for locking the lever 149 in its clockwise position during minus operations, so that the bar 160 will be retained in locking position during the first and second parts of said minus operations to lock the release bars 106 and 108 against depression to enforce the initiation of the second part of said minus operation.

Clockwise movement of the lever 149 (Fig. 13), when the Minus bar 107 is depressed, through a link 169 pivotally connecting said lever to an arm 170 free on the shaft 77, rocks said arm 170 clockwise in unison therewith to move a hook-shaped portion 171 thereon beyond a stud 172 in a lever 173 fast on a shaft 174 journaled in the frames 62 and 63. The arm 170 (Figs. 11, 12, and 13) has pivotally connected thereto the lower end of a link 175 having in the upper end thereof a stud 176, which engages a slot in the lever 173.

Clockwise movement of the arm 170, when the Minus bar 107 is depressed, shifts the link 175 downwardly to engage the stud 176 with a notch 177 in a hook-shaped downward extension of a lever 178 free on the shaft 174. The lever 178 is connected by a link 179 to a cam lever 180 free on the rod 86 and carrying rollers 181 and 182, which cooperate, respectively, with the peripheries of companion plate cams 183 and 184 secured on the main cam shaft 82.

As explained previously, depression of the Minus bar 107 (Fig. 13) rocks the arm 170 clockwise to move the hook 171 thereon beyond the stud 172, whereupon operation of the cams 183 and 184, according to the time given in space 3 of the chart, Fig. 47, rocks the levers 180 and 178 clockwise, which movement of said lever 178 is transmitted, by the stud 176, to the lever 173 to move the stud 172 beneath the hook 171 to latch the arm 170 and the lever 149 in their clockwise or moved positions until near the end of machine operation, when said parts are restored to normal positions. It is obvious from the foregoing that, when the machine comes to rest after the first part of a minus operation has been performed and the Minus bar 107 has been restored upwardly to undepressed position, the lever 149 remains in its clockwise or moved position and, in so doing, retains the control bar 160 (Fig. 15) in its rearward position, where the surfaces 161 and 162, in cooperation with the studs 163 and 164, lock the Plus release bar 106 and the Clear release bar 108 against depression. This enforces a second depression of the Minus bar 107 to initiate the second or last part of a minus operation before any other type of operation may be performed.

The second depression of the Minus bar 107 (Figs. 6, 7, and 13) causes the slide 97 to be shifted forwardly, in the usual manner, to disengage the arm 85 from the shoulder 84 and to close the switch 133 to initiate the second part of a minus operation, during which all of the indicator sets are restored to their original positions.

At the end of the second part of a minus operation, the cams 183 and 184 restore the lever 173 to normal position, as shown in Fig. 13, to move the stud 172 out of engagement with the hook 171 to permit a spring 185, tensioned between a stationary stud and the lever 149, to restore said lever and connected parts to normal positions, as shown here. A spring 186, tensioned between the lever 173 and a stationary stud, urges said lever counter-clockwise to normal position, as shown in Figs. 11 and 13, which position is determined by a stop stud 187 in the frame 62.

At the end of the second part of the minus operation, the cam 134 (Fig. 6), in cooperation with the roller 135, restores the slide 97 rearwardly, to disengage the clutch mechanism and to open the switch for the operating motor, in exactly the same manner as explained in connection with the Plus bar 106.

*Clear release bar*

Depression of the Clear release bar 108 (Figs. 4, 6, and 48) causes the stud 164 carried thereby, in cooperation with the surface 146 on the lever 125, to rock said lever clockwise against the action of the spring 126 to disengage the pawl 100 from the square stud 103 to release the slide 97 and the lever 95 for forward and counter-clockwise movement, respectively, under influence of the spring 104. Depression of the Clear release bar 108 (Figs. 6, 7, and 9) shifts the link 93 and the stud 92 downwardly to move said stud into the clearance portion of the L-shaped slot 91 in the arm 89, so that counterclockwise releasing movement of the lever 95 will not be imparted to said arm 89, and consequently the main clutch mechanism shown in Fig. 7 will not be operated, as in other operations.

Figure 3:
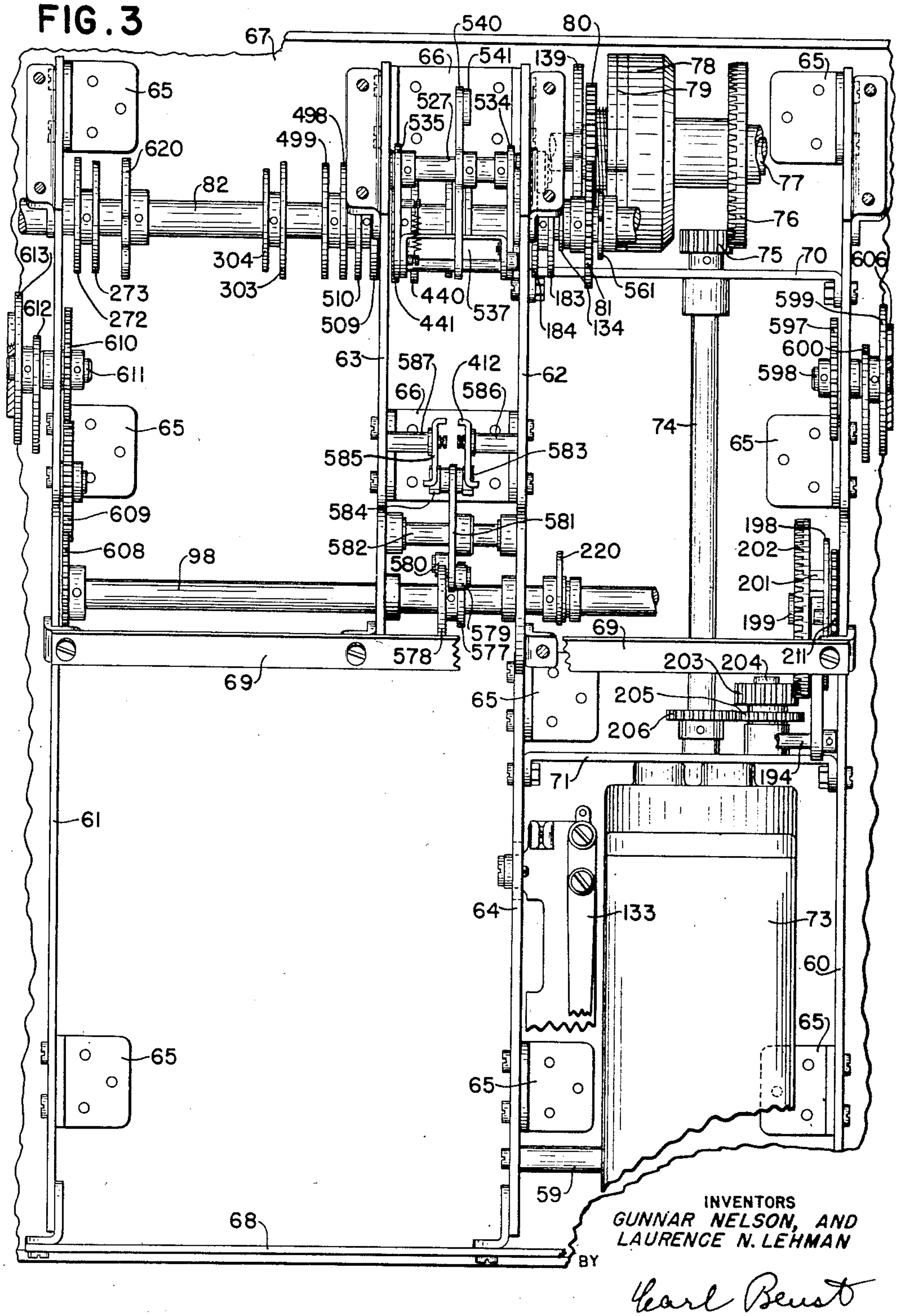
Fig. 3 is a plan view showing the framework, the base, and a part of the operating mechanism.

From observation of Fig. 9 it will be seen that, when the Clear bar 108 is in undepressed position, the stud 92 is in alinement with the clearance portion of an inverted L-shaped slot 190 in an arm 191 free on the stud 90, and consequently the movement of the lever 95 is not imparted to said arm at such times. However, downward movement of the stud 92, when the Clear bar 108 is depressed, moves said stud into the downward branch of the slot 190 to connect the arm 191 to the lever 95 for movement in unison therewith. The arm 191 is connected by a link 192 to a crank 193 secured on one end of a shaft 194 journaled in the frames 60 and 64 (Fig. 3). Also secured on the shaft 194 is a clutch control arm 195, which cooperates with an upward extension of a clutch engaging pawl 196 free on a stud 197 in a clutch disk 198 free on a stud 199 secured in the frame 60, to normally retain said pawl, against the action of a spring 200, out of engagement with the teeth of a clutch ratchet 201. The clutch ratchet 201 is secured to a crown gear 202 free on the stud 199, said gear meshing with a pinion 203 (Figs. 3 and 4) free on a stud 204 secured in the plate 71. The pinion 203 has integral therewith a gear 205, which meshes with the gear 206.

When the Clear bar 108 is in undepressed position, as shown in Fig. 9, the tail portion 208 of a bar 207, the upper end of which bar is pivotally connected to said Clear bar 108, is interposed between the shaft 194 and a stud 209, which forms a pivotal connection between the link 192 and the crank 193; consequently, at such times, the arm 195 is locked in the position shown here to retain the pawl 196 out of engagement with the teeth of the ratchet 201. A stop stud 210 in the disk 198, in cooperation with the upward extension of the pawl 196, determines the extent of its disengaging movement and, with said extension of the pawl 196, forms a positive blocking means between the arm 195 and the clutch disk 198. Depression of the Clear bar 108 moves the tail portion 208 of the bar 207 beyond the stud 209 and moves a clearance portion of said bar 207 opposite said stud so that the arm 195 may be rocked counter-clockwise to disengaged position.

Counter-clockwise releasing movement of the lever 95 and the arm 191 rocks the clutch arm 195 also counter-clockwise to disengage said arm from the upper projection of the pawl 196 to permit said pawl, under the influence of the spring 200, to be engaged with the teeth of the ratchet 201 so that the clutch driven member or disk 198 will be operatively connected to the motor 73 (Fig. 3). The disk 198 (Figs. 3 and 4) has secured to the outside face thereof a gear 211, which meshes with a gear 212 free on a stud 213 in the frame 60, said gear 212 in turn meshing with a gear 214 free on a stud 215 in said frame 60. The gear 214 meshes with a gear 216 secured on the reset or clear cam shaft 98 journaled in the frames 60 to 63 inclusive.

Figure 4:
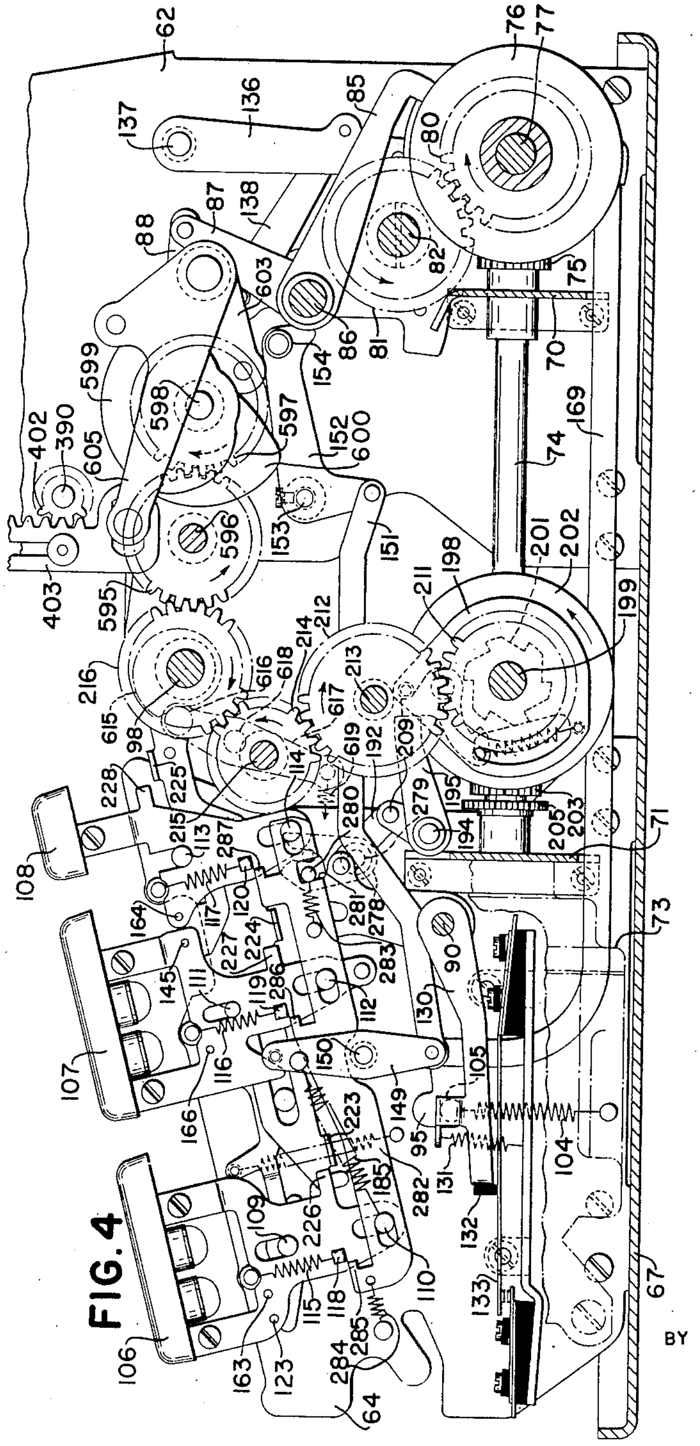
Fig. 4 is a side elevation, as observed from the right, of the machine operating and releasing mechanisms.

Counter-clockwise movement of the lever 95 (Fig. 6) closes the contact points of the switch 133, as explained before, to cause the motor 73 to operate, which, through the clutch mechanism and the train of gears explained above, drives the clear cam shaft 98 clockwise, as viewed in Fig. 4.

When the cam shaft 98 nears the end of one revolution of movement in a clockwise direction, a restoring cam 220 (Figs. 3 and 6) secured thereon, which functions according to the time given in space 15 of the chart, Fig. 47, engages a roller 221 on the link 138 and shifts said link and the slide 97 rearwardly until the pawl 100 latches behind the square stud 103 to restore the lever 95 and the arm 191 (Fig. 9) clockwise to normal position and to move the arm 195 into the path of the upward extension of the pawl 196, to disengage said pawl from the teeth of the ratchet 201 to terminate operation of the machine after said cam shaft 98 has completed one clockwise revolution.

By referring to Fig. 48 it will be noted that the lever 125 has an extension 222, which cooperates with a flange on the stud 111 to prevent excessive side play of said lever 125.

The slide 97 (Figs. 4 and 6) has bent-over ears 223, 224, and 225, which cooperate, respectively, with projections 226, 227, and 228 on the release bars 106, 107, and 108, whereupon forward releasing movement of said slide 97 locks the depressed bar in depressed position and locks the other bars in undepressed positions. When the bars 106, 107, and 108 are in undepressed positions, their corresponding projections 226, 227, and 228 are above the corresponding ears 223, 224, and 225. Depression of the Clear bar 108, for example, moves the projection 228 beneath the ear 225, whereupon forward releasing movement of the slide 97 moves said ear 225 over the projection 228 to secure the Clear bar 108 in depressed position, and simultaneously the ears 223 and 224 move beneath the corresponding projections 226 and 227 to lock the release bars 106 and 107 in undepressed position. Likewise, partial depression of any one of the release bars moves the corresponding projection into the path of the corresponding ear to obstruct forward releasing movement of the slide 97 until said bar is fully depressed.

The lever 125 and the stop pawl 100 (Figs. 6 and 48) form a non-repeat device to prevent repeat operations of the machine in case any one of the release bars 106, 107, or 108 is retained depressed after machine operation has been completed.

In case any one of the release bars 106, 107, or 108 is retained depressed at the end of machine operation, the lever 125 is retained in its moved or clockwise position, in which the bent-over portion 127 lies in the path of the square stud 103 and the forward end of the stop pawl 100. Near the end of either plus, minus, or clear operations, the slide 97 is restored sufficiently rearwardly by the cam 134 to permit the pawl 100 to ride off the lower edge of the portion 127 and to be returned clockwise by the spring 101 into the path of said portion 127. When the cam 134 (Figs. 6 and 48) releases the slide 97 and connected parts to the action of the spring 104, said spring returns said slide forwardly until the nose of the stop pawl 100 contacts the portion 127 to terminate operation of the machine. When the pressure is removed from the depressed release bar 106, 107, or 108, the spring 126 restores the lever 125 counter-clockwise to normal position, during which restoration the portion 127 rides off the nose of the pawl 100 and said pawl again engages the stud 103 to locate the slide 97 and connected parts in untripped position and thereby prevent repeat operations of the machine.

It will be seen by referring to Figs. 6 and 7 that, in operations initiated by the depression of either the Plus bar 106 or the Minus bar 107, counter-clockwise movement of the arm 89, to shift the link 88 forward to release the main clutch mechanism shown in Fig. 7, moves a stud 229 carried by said link beneath a hook-shaped extension 230 of the bar 207 to lock the Clear bar 108 in undepressed position during such operations.

A locking bar 231, which is shown best in Figs. 14 and 17, is provided for preventing depression of more than one of the release bars 106, 107, and 108 at one time. The locking bar 231 is shiftably mounted by means of parallel slots therein in cooperation with the studs 109 and 111. Spring fingers 232 and 233, free on the stud 110 and urged in opposite directions by a spring 234 tensioned therebetween, cooperate with the fixed stud 109 and a stud 235 in the bar 231, to yieldingly maintain said bar in normal position, as shown here, which position is determined by said spring fingers alining the stud 235 with the stud 109.

When the locking bar 231 is in normal position, as shown here, a notch 236 therein is in alinement with the stud 166 in the Minus bar 107.

Depression of the Plus bar 106 causes the stud 163, in cooperation with an angular camming surface on the forward end of the bar 231, to shift said bar rearwardly against the action of the spring finger 232 to move the notch 236 out of alinement with the stud 166 and to move a raised portion on the upper edge of said bar 231 into the path of the stud 164 in the Clear bar 108, to lock said bars 107 and 108 in undepressed positions. Likewise, depression of the Clear bar 108 causes the stud 164, in cooperation with an angular camming surface on the rearward end of the bar 231, to shift said bar forwardly, against the action of the spring finger 233, to lock the Plus bar 106 and the Minus bar 107 against depression. Depression of the Minus bar 107 causes the stud 166 to enter the notch 236 to secure the bar 231 in normal position, in which the angular camming surfaces on the upper edge of said bar, in cooperation with the studs 163 and 164, obstruct depression of the release bars 106 and 108.

In Fig. 18 a cross-sectional view of the lower ends of the lever 95 and the arms 89 and 191 is given to show how the hubs of these arms are telescoped one on the other. The hub for the lever 95 bears on the stud 90. The outside diameter of said hub forms a bearing for the hub in the arm 89, and the outside diameter of said latter hub forms a bearing for the hub in the arm 191. A spring clip engages an annular groove in the stud 90 to retain said hubs against lateral displacement.

Other mechanism indirectly associated with the three machine release bars will be explained later herein in connection with the mechanism with which they are directly associated.

*Keyboard*

In addition to the three release bars 106, 107, and 108 (Figs. 1, 2, 20, and 24), the keyboard of the machine embodying the present invention includes five rows of numeral keys 238, two rows of selecting keys 239, and a release key 240 for releasing any depressed numeral or selecting key. All of the keys, including the starting bars, extend through corresponding slots in a keyboard top plate 241, secured to the frames 61 and 64, and each row of numeral and selecting keys is mounted on a corresponding partition plate 242, the upper end of which is secured to the keyboard top plate 241, said partition plates having therein notches which engage slots in supporting rods 243 and 244, secured between the frames 61 and 64.

The construction of the keyboard for the machine of the instant invention is similar in every respect to that disclosed in the United States Patent No. 2,189,851, issued February 13, 1940, to Paul H. Williams et al., to which reference may be had for a complete description of said keyboard mechanism, as herein only the part of the keyboard having a direct bearing on the present invention will be described in detail.

*Numeral key banks*

As explained in the "General description," the five rows of numeral keys 238 are used to set up numbers to be entered in the indicator sets, and said keys are supported for vertical sliding movement by means of corresponding notches formed by bent-over ears on the upper edge of the corresponding partition plate 242 and by means of square studs 245 (Fig. 20) secured in the lower ends of said keys, which studs engage corresponding slots in said partition plate 242. The keys 238 are urged and normally maintained in upward or undepressed position by a suitable spring, not shown.

Inasmuch as the construction of each of the five banks of numeral keys is similar in every respect, it is believed that a description of the row shown in Fig. 20 and the mechanism associated therewith will be sufficient for the purpose of this specification.

Depression of any one of the numeral keys 238 from 1 to 8 inclusive moves the stud 245 in the lower end thereof into the path of a corresponding graduated step 246 on the forward end of an actuator 247 supported for horizontal shifting movement by means of an undercut portion of the forward end thereof, which is retained in a corresponding slot in the rod 243 by a bar 248 secured in proper spaced relationship to said rod 243, and by means of a slotted portion on the rearward end of said actuator in cooperation with a corresponding slot in a bar 249 supported by the frames 60, 61, 62, and 63 (Fig 3). The stud 245 in the "9" key 238 does not have a corresponding step 246 on the actuator 247, but permits said actuator to move full distance rearwardly to "9" position, which is determined by a shoulder 288 (Fig. 20), formed by the slot in the forward end of said actuator, contacting the rod 243.

Each of the numeral keys 238 (Fig. 20) carries a pin 250, which pins extend through corresponding slots in the plate 242 and which cooperate, respectively, with corresponding camming surfaces in openings in a control plate 251, corresponding hooks in openings in a flexible detent 252, and corresponding hooks in openings in a corresponding locking plate 253, said plates 251 and 253 and said detent 252 being supported for horizontal shifting movement between rollers mounted on studs 254 secured in the partition plate 242. A spring 255, tensioned between the control plate 251 and the flexible detent 252, urges said plate and said detent rearwardly and forwardly, respectively, to normally maintain said plate and said detent in yielding contact with the pins 250.

Depression of any one of the numeral keys 238 causes the pin 250 therein, in cooperation with an angular camming surface on the corresponding hook in the flexible detent 252, to shift said detent first rearwardly against the action of the spring 255. After said pin moves beyond said hook, said spring returns said detent forwardly to latch the hook over the pin in the depressed key to retain said key in depressed position. In case another numeral key 238 is depressed after one key has already been depressed, the pin 250 in said key, in cooperation with the angular camming surface on the upper end of the corresponding hook of the detent 252, shifts said detent 252 rearwardly, against the action of the spring 255, to release the previously depressed key, after which said detent is spring-returned forwardly to latch the latter key in depressed position. This type of key action is often referred to as "flexible key action." Mechanism to be described later is provided to shift the detent 252 rearwardly, near the end of machine operation, to release any depressed key.

It is to be understood that what has been said above concerning the denominational order of numeral keys shown in Fig. 20 applies to all five rows of numeral keys.

Depression of any one of the numeral keys 238 (Fig. 20) causes the pin 250 therein, in cooperation with the corresponding angular camming slot in the control plate 251, to shift said control plate forwardly, against the action of the spring 255, causing the forward end of said control plate, in cooperation with the bent-over upper end of a zero latch 256 free on a stud 257 secured in the partition plate 242, to rock said zero latch counterclockwise against the action of a spring 258 tensioned between said latch and the control plate 251. This disengages a tooth on said latch from a block 259 secured to the actuator 247, to release said actuator for rearward positioning movement.

The locking plate 253 (Figs. 20 and 39) has a nose on an upward extension 260 thereof, which is urged by a spring 261 into yielding contact with a projection 262 secured in a slot in a key lock shaft 263 journaled in the keyboard framework. Secured on the shaft 263 is a crank 264 having a stud 265, which engages a slot in the upper end of an arm 266 free on a stud 267 in the frame 61. A link 268 pivotally connects the arm 266 to a cam lever 269 free on the rod 86, said lever carrying rollers 270 and 271, which cooperate, respectively, with the peripheries of companion plate cams 272 and 273 secured on the main cam shaft 82.

During machine operations, rotation of the main shaft 82 and the cams 272 and 273 causes said cams to operate the key lock shaft 263 according to the time given in space 8 of the chart, Fig. 47, to cause the spring 261 to shift the plate 253 rearwardly, at the beginning of machine operations, to move the teeth in said plate beneath the pins 250 in the undepressed numeral keys 238, to lock said keys against depression during machine operation. Near the end of machine operation, the cams 272 and 273 and connected mechanism return the plate 253 forwardly to unlock the numeral keys 238.

*Release bar locking mechanism*

Mechanism is provided for locking the release bars 106, 107, and 108 against depression while a numeral key is partially depressed, such mechanism being shown best in Figs. 4, 18, and 20.

A rod 274 extends the full width of the keyboard and into the paths of the rearward ends of the flexible detents 252 for the five rows of numeral keys 238, and also into the paths of similar flexible detents for the selecting keys 239 (Fig. 24), said rod being secured to the upper ends of similar arms 275 secured on a shaft 276 journaled in the keyboard framework. The right-hand end of the rod 274 engages a notch 277 in the upper end of an arm 278 free on a stud 279 secured in the frame 64. The arm 278 (Figs. 4 and 18) carries a stud 280, which is normally held in yielding engagement with a forward wall of an enlarged slot 281 in a locking plate 282 by a spring 283 tensioned between said stud and a stud in said locking plate. The plate 282 is slidably supported by means of parallel slots therein, in cooperation with the studs 110, 112, and 114, and is normally retained in its forward position by a spring 284 tensioned between said plate and a stationary stud. A comparatively weak torsion spring (not shown) urges the shaft 276, the arms 275, and the rod 274 in a counter-clockwise direction to normally retain said rod in yielding engagement with the rearward ends of the flexible detents 252.

Partial depression of any one of the keys 238 (Fig. 20) causes the pin 250 therein, in cooperation with the angular nose of the corresponding hook in the detent 252, to shift said detent rearwardly against the action of the spring 255, causing said detent to rock the rod 274 clockwise. Clockwise movement of the rod 274 is transmitted to the arm 278 and the stud 280 (Fig. 4), and, inasmuch as the spring 283 is stronger than the spring 284, the locking plate 282 is shifted rearwardly by said arm 278 to move hook-shaped projections 285, 286, and 287 on the upper edge of said plate into the paths of the square studs 118, 119, and 120, to lock the release bars 106, 107, and 108 against depression while a numeral key 238 is partially depressed.

As explained previously, full depression of one of the keys 238 (Fig. 20) causes the pin 250 to move beyond the corersponding hook in the detent 252 to permit the spring 255 to return said detent forwardly, which in turn permits the spring 284 to return the locking plate 282 forwardly to unlock the release bars 106, 107, and 108.

*Key release mechanism*

Mechanism is provided for shifting the flexible detents 252 rearwardly near the end of machine operation to release any depressed numeral keys 238, said mechanism being shown particularly in Fig. 20.

The flexible detent 252 (Fig. 20) has an upward extension 290 with an angular camming surface thereon, which cooperates with a stud 291 in an arm 292 secured on a key release shaft 293 journaled in the keyboard framework. Also secured on the shaft 293 is an arm 294 having a stud 295, which cooperates with the upper end of an arm 296 pivoted on a stud 297 carried by a bracket 298 secured to the machine base 67. A link 299 pivotally connects the arm 296 to a cam lever 300 free on the rod 86. The cam lever 300 carries rollers 301 and 302, which cooperate, respectively, with the peripheries of companion plate cams 303 and 304 secured on the main shaft 82.

Near the end of machine operation, the cams 303 and 304, operating according to the time given in space 9 of the chart, Fig. 47, rock the lever 300 first counter-clockwise and back to normal position. Counter-clockwise movement of the lever 300, through the link 299, the arm 296, and the arm 294, rocks the key release shaft 293 and the arm 292 counter-clockwise, against the action of a spring (not shown) which normally retains said parts in normal position as shown here. This causes the stud 291, in cooperation with the angular surface on the upper end of the extension 290, to shift the flexible detent 252 rearwardly, against the action of the spring 255, to disengage the hook in said detent from the pin 250 of the depressed numeral key 238, to release said key to the action of its spring, which immediately restores said key upwardly to undepressed position. Return movement clockwise of the lever 300 permits the spring 255 to restore the detent 252 forwardly to normal position, as shown in Fig. 20.

In addition to the automatic key releasing means explained above, which operates near the end of machine operation, the release key 240 (Fig. 1) is provided for manually releasing any depressed numeral key 238 or selecting key 239.

Figure 5:
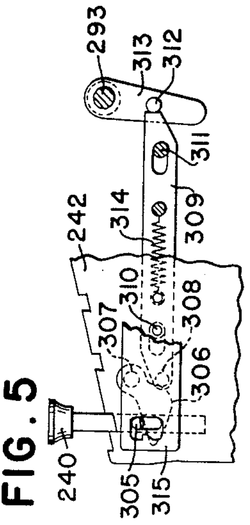
Fig. 5 is a detail view of the Release key and associated mechanism for manually releasing depressed numeral and/or selecting keys.

The release key 240 (Figs. 1, 2, and 5) is depressibly mounted on its corresponding partition plate 242 in exactly the same manner as the numeral keys 238 (Fig. 20), as explained above. The release key 240 has a pin 305, which extends through a clearance slot in the partition plate 242 and cooperates with an angular camming surface on an arm 306 turnably mounted on a stud 307 secured in the plate 242. The arm 306 has another camming surface, which cooperates with a stud 308 in the forward end of a slide 309 shiftably mounted on the plate 242 by means of parallel slots therein in cooperation with studs 310 and 311 secured in said plate. The rearward end of the slide 309 cooperates with a stud 312 in an arm 313 secured on the key release shaft 293 (Figs. 5 and 20).

Depression of the release key 240 causes the pin 305, in cooperation with the camming surface on the arm 306, to rock said arm counter-clockwise, causing the other camming surface thereon, in cooperation with the stud 308, to shift the slide 309 rearwardly against the action of a spring 314 tensioned between said slide and the plate 242. Rearward movement of the slide 309, in cooperation with the stud 312, rocks the arm 313 and the release shaft 293 counter-clockwise, causing the stud 291 (Fig. 20) in the arm 292 to shift the detent 252 rearwardly against the action of the spring 255 to manually release any depressed numeral key and, in a like manner, to release any depressed selecting key.

The release key 240 has cooperating therewith a locking plate 315, which is slidably mounted on the partition plate 242 for said release key and which functions in exactly the same manner as the locking plate 253 for the row of numeral keys shown in Fig. 20, to lock said release key 240 against depression during machine operation.

*Selecting key banks*

As explained previously, the construction of the two rows of selecting keys 239 (Figs. 1, 2, and 24) is similar in every respect to that of the rows of numeral keys 238, shown in Fig. 20 and explained above.

Each of the selecting keys 239 is depressibly mounted on its corresponding partition plate 242 in exactly the same manner as the numeral keys 238, and each of said keys carries a pin 316, which extends through a clearance slot in the corresponding partition plate 242. Each of the pins 316 cooperates with corresponding camming surfaces in apertures in a control plate 317, with corresponding hooks in apertures in a flexible detent 318, and with corresponding inverted hooks in apertures in a locking plate 319, said plates and said detent being mounted for horizontal shifting movement between four rollers in turn supported by four studs 320 secured in the corresponding partition plate 242. A spring 321, tensioned between the control plate 317 and the flexible detent 318, urges said parts rearwardly and forwardly, respectively, to maintain the camming surfaces in the apertures in said control plate in resilient engagement with the pins 316 and to normally maintain angular camming surfaces formed on corresponding hooks in the apertures in the flexible detent 318 in resilient engagement with said pins 316.

The flexible detent 318 cooperates with the pins 316 in exactly the same manner as the flexible detent 252 (Fig. 20) cooperates with the pins 250 for the row of numeral keys 238 shown therein, to latch the depressed selecting key in depressed position. The flexible detent 318 likewise cooperates with the rod 274 to shift the locking plate 282 (Fig. 4) rearwardly during the depression of a selecting key to lock the release bars 106, 107, and 108 against depression until said selecting key is fully depressed.

The flexible detent 318 likewise has an upward projection 322 with an angular camming surface, which cooperates with a stud 323 in an arm 324 secured to the key release shaft 293 for releasing any depressed selecting key 239 automatically at the end of machine operation, or manually by use of the release key 240 (Figs. 2 and 5). The locking plate 319 for the selecting keys 239 has an upward extension with a nose thereon, which is normally maintained in contact with a projection 325 on the key lock shaft 263 by a spring 326 tensioned between said extension and said projection. The locking plate 319 functions in exactly the same manner as the locking plate 253 (Fig. 20) for the numeral keys 238 to lock said selecting keys 239 against depression during machine operation.

*Minus bar locking means*

As explained previously, there are two types of minus operations, one in which the numeral keys 238 (Figs. 2 and 20) are used to set up a number to be subtractively entered in all the indicator sets, and the other in which the selecting keys 239 are used to select the desired one of the indicator sets for zeroizing, at which time the number in said selected indicator set is subtracted from all the other indicator sets. Therefore it is never necessary to depress both a numeral key 238 and a selecting key 239 in any minus operations, and to prevent this, mechanism is provided for locking the Minus release bar 107 against depression when both a numeral key 238 and a selecting key 239 are depressed.

The zero latch 256 (Fig. 20) for the row of numeral keys shown here cooperates with the lower end of a finger 329 secured on a shaft 328 journaled in forward extensions of the frames 61 and 64, there being a similar finger 329 for each of the other rows of numeral keys. Secured on the right-hand end of the shaft 328 is an arm 330 (Figs. 20 and 21) having a stud 331 which cooperates with an upward extension of a segment 332 pivoted on a stud 333 carried by a locking bar 334 (Figs. 16, 17, 19, and 21) slidably mounted by means of parallel slots therein, in cooperation with the studs 109 and 111. A spring 341, tensioned between the stud 331 and a fixed stud in the frame 64, urges said arm, the shaft 328, and the fingers 329 counter-clockwise to cause said fingers to yieldingly engage the corresponding zero latch 256.

The control plate 317 for the row of selecting keys shown in Fig. 24 cooperates with the lower end of a finger 335 secured on a sleeve 336 journaled on the shaft 328, there being such a finger 335 for the other row of selecting keys. Secured on the right-hand end of the sleeve 336 is an arm 337 (Figs. 21 and 24) having a stud 338, which cooperates with a downward extension of the segment 332. The stud 338 has pivoted thereon the forward end of a pitman 339, the rearward end of which is slotted to embrace a stud 340 in the lower end of the Minus release bar 107. A spring 342, tensioned between the bar 334 and a stationary stud in the frame 64, urges said bar rearwardly to normally maintain a slot 343 therein in alinement with the stud 166 in the Minus release bar 107.

Depression of any one of the numeral keys 238 (Fig. 20) rocks the control plate 251 forwardly, said plate in turn rocking the zero latch 256 counter-clockwise, which movement rocks the finger 329, the shaft 328, and the arm 330 in a clockwise direction, causing the stud 331 (Fig. 21) to engage the upper extension of the segment 332 and rock said segment counter-clockwise without imparting any forward shifting movement to the bar 334.

With one of the numeral keys 238 depressed, as explained above, depression of any one of the selecting keys 239 shifts the control plate 317 (Figs. 16, 21, and 24) forwardly, causing said plate, in cooperation with the finger 335, to rock the sleeve 336 and the arm 337 clockwise. Inasmuch as the upper end of the segment 332 is retained by the stud 331, clockwise movement of the arm 337 causes the stud 338 to engage and shift the bar 334 forwardly against the action of the spring 342 to move the clearance slot 343 out of the path of the stud 166 and to simultaneously move a locking surface on the upper edge of said bar 334 into the path of said stud 166 to obstruct depression of the Minus release bar 107 when both a numeral key 238 and a selecting key 239 are depressed.

Depression of any one of the selecting keys 239, when no numeral key 238 is depressed, causes the stud 338, in cooperation with the downward extension of the segment 332, to rock said segment clockwise without imparting any forward locking movement to the bar 334, to permit depression of the Minus bar 107 in this case.

A clearance slot 344 (Fig. 16) is provided in the upper edge of the bar 334 for the stud 163, so that said bar does not interfere in any way with depression of the Plus release bar 106.

*Actuator mechanism*

The actuator 247 (Figs. 20 and 22) has therein a vertical slot 347, which engages a stud 348 secured in a segment 349 secured to a downward extension 350 of reducer arms 351, said arms being connected to a segment 352 (Fig. 22) similar in every respect to the segment 349, said segments and said reducer arms being rotatably supported on a shaft 353 journaled in the frames 60 and 61 (Fig. 3). Secured on the shaft 353 (Figs. 20, 22, and 23) are similar arms 354 supporting a leading and restoring bar 355 adapted to be yieldingly retained in engagement with similar abutting surfaces on the segments 349 and 352 by springs 356 and 357 tensioned between said segments and corresponding hooks on a plate secured to the bar 355. The segments 349 and 352 (Figs. 20 and 22) carry, respectively, studs 358 and 359, which engage corresponding horizontal slots in corresponding actuator racks 360 and 361 mounted for vertical shifting movement by means of slots in the lower ends thereof in cooperation with corresponding grooves in the bar 249 supported by the frames 60 to 63 inclusive, and by means of parallel slots therein (Fig. 27) in cooperation with bars 363 and 364 mounted, respectively, between the frames 60 and 62, and 61 and 63.

The actuator rack 360, for the bank of amount keys shown in Fig. 20, is for actuating the units wheels of the left-hand column of indicator sets (Fig. 46), and the corresponding actuator rack 361 is for actuating the units wheels of the right-hand column of indicator sets, said racks being always positioned exactly alike, inasmuch as they are maintained in fixed relationship to each other by the segments 349 and 352, which are in turn secured in fixed relationship to each other by the reducer arms 351.

The racks 360 and 361 are retained in alinement with the corresponding wheels of the indicator sets by means of corresponding slots in plates 365 (Fig. 46), there being three of such plates for each column of indicator sets secured on three of the indicator line supporting yokes.

Secured on opposite ends of the shaft 353 (Figs. 22 and 23) are plates 366 and 367 having cam slots 368 engaged by rollers 369 carried, respectively, by right and left arms 370 and 371 free on studs 372 and 373 secured in the frames 60 and 61. The arms 370 and 371 are connected by links 374 and 375 to similar cam levers 376 and 377 free on studs 362 secured in the frames 60 and 61. Each of the levers 376 and 377 carries rollers 378 and 379, which cooperate with the peripheries of their respective companion plate cams 380 and 381 secured on the main cam shaft 82.

As explained previously, depression of any one of the numeral keys 238 (Fig. 20) moves the stud 245 therein in the path of the corresponding step 246 on the actuator 247. Operation of the machine causes the cams 380 and 381 and the cam slot 368 in the plate 366 to operate the restoring bar 355 first counter-clockwise and back to normal position, according to the time given in space 1 of the chart, Fig. 47. Initial movement of the bar 355 (Figs. 20, 22, and 23), through the springs 356 and 357, carries the segments 349 and 352 and the actuator 247 rearwardly in unison therewith until the step 246 contacts the stud 245 of the depressed numeral key 238 to position said actuator, the segments 349 and 352, and the racks 360 and 361 in accordance with the value of the depressed numeral key. After said parts have been positioned, the restoring bar 355 completes its initial counter-clockwise movement, stretching the springs 356 and 357.

After the segments 349 and 352 have been positioned in the manner explained above, an alining bar 383 (Fig. 20) secured to an aliner framework 384, the right and left arms of which are secured on an aliner shaft 385, is engaged with corresponding alining teeth in said segments 349 and 352, to secure said segments and connected parts, including the racks 360 and 361, in set positions. The alining bar 383 functions according to the time given in space 2 of the chart, Fig. 47.

In plus operations, after the racks 360 and 361, for the numeral keys shown in Fig. 20, have been positioned as explained above, the corresponding wheels of the indicator sets are engaged therewith, and return movement forwardly of the restoring bar 355 returns the segments 349 and 352, the actuator 247, and the racks 360 and 361 to normal positions to rotate the wheels of the indicator sets in an additive direction in accordance with the value of the depressed numeral key 238 to enter said value therein.

In minus operations, the wheels of the indicator sets are engaged with the racks 360 and 361 prior to their initial movement upwardly, which movement of said racks, under influence of the restoring bar 355, causes the corresponding wheels of the indicator sets to be rotated in a subtractive direction to subtract therefrom the value of the depressed numeral key 238.

*Indicator set selecting and engaging mechanism*

As explained in the general description at the beginning of this specification, the present machine is provided with two vertical groups of columns of indicator sets 386 (Fig. 1), each column comprising ten such indicator sets arranged in staggered relationship to each other to facilitate the assembling of parts and to provide a compact arrangement of said indicator sets. The different indicator sets are selected for engagement with the actuator racks 360 and 361 by the two rows of selecting keys 239, said keys and said indicator sets having corresponding alphabetical designations, so that they may be properly identified with each other. Each row of selecting keys comprises ten keys, and the left-hand row of said keys selects the left-hand column of indicator sets, and the right-hand row of said selecting keys selects the right-hand column of indicator sets. For example, depression of the A key 239 selects the A indicator set 386 for engagement with the actuator racks, and depression of the B selecting key 239 selects the B indicator set for engagement with the actuator racks, and so on. The indicator sets 386 are visible through apertures 387 (Figs. 1 and 46) in cover plates 388 secured, respectively, to the frames 60 and 62, and 61 and 63, said plates being located directly in back of corresponding openings 389 in the front upper portion of the cabinet 72.

The indicator set corresponding to the letter R is shown in detail in Figs. 40, 42, 43, 44, and 45, and, as the construction of all the indicator sets is substantially the same, the R indicator set will be considered as representative of all the sets and will be described in detail.

The indicator set corresponding to the letter R (Figs. 27, 43, and 46) comprises an indicator line or shaft 390 mounted for slight horizontal shifting movement in slots in the frames 60 and 62, said shaft adapted to rotatably support five indicator wheels 391 corresponding to the five denominational orders of the machine. Each of the wheels 391 is secured on a hub 392 (Figs. 43 and 44) free on the shaft 390, said hub also having secured thereon a gear 393 and a zero stop plate 394. The gears 393 are arranged to be engaged with teeth in the corresponding actuator racks 361 for actuation thereby. Each of the zero stop plates 394 has a stopping projection thereon which cooperates with a corresponding zero stop pawl 395 secured to the bail of a yoke 396 free on a shaft 397 journaled in the frames 60 and 62.

The above zero stop mechanism, including the plate 394 and the pawl 395, functions only in the type of minus operations in which it is desired to zeroize or subtotalize a selected one of the indicator sets and simultaneously subtract the number therein from all the other indicator sets, there being another zero stop mechanism which functions in clearing operations to stop the wheels of all the indicator sets in zero position in such operations.

The five indicator wheels 391 and their corresponding gears 393 and zero stop plates 394 are retained in proper side spacing relationship to each other and in proper position on the shaft 390 by right and left arms 398 and 399 of a support yoke 400, said arms having axially alined borings therein which freely engage the shaft 390, and having slots 401 (Fig. 40) therein, which freely engage the shaft 397 to permit horizontal engaging and disengaging movement of said indicator shaft 390. Secured on the right-hand end of the shaft 390 (Figs. 28, 43, and 46) is a wide pinion 402, which, when the indicator set is in disengaged position, as shown here, meshes with the teeth in a clearing rack 403 for the right-hand column of indicator sets, said indicator rack functioning only in clearing operations, as will be explained later. When the shaft 390 is shifted horizontally to engage the gears 393 with the actuator racks 361, the pinion 402 (Fig. 28) is disengaged from the teeth in the rack 403 and simultaneously engaged with a corresponding tooth 404 on an alining bar 405 secured to the frame 60, to hold said shaft 390 against rotation at such times.

Secured on the left-hand end of the shaft 390 (Figs. 43, 44, and 45) is a shifting drum 406 having therein an annular groove engaged by a stud 407 in an arm of a bell crank 408 free on a stud 409 carried by a bracket 410 secured to the frame 62. The other arm of the bell crank 408 carries a stud 411 engaged by a notch formed by bent-over ears on an indicator shifting bar 412, which functions, in a manner to be described later, to shift the shaft 390 axially toward the right (Fig. 43) in clearing operations. The right-hand or axial shifting movement of the shaft 390 alines clearing shoulders 413 formed therein with teeth 414 of clearing pawls 415, one of which is pivotally mounted on a stud carried by the corresponding indicator wheel 391. Each of the pawls 415 is urged clockwise by a spring 416, as shown in Fig. 45, to maintain their teeth 414 in yielding engagement with the shaft 390. After the shaft 390 has been shifted axially, as explained above, the clearing rack 403 operates to rotate said shaft in a counter-clockwise direction, as observed in Fig. 45, to turn the indicator wheels 391 to zero, as will be explained later.

Secured on the shaft 397 (Figs. 40 and 43) are right-hand and left-hand engaging arms 417 and 418, each having a camming slot 419, which cooperates with opposite ends of the shaft 390, to shift said shaft horizontally to engage and disengage the indicator sets. A rearward extension of the arm 418 has pivotally connected thereto the lower end of a link 420, the upper end of which carries a stud 421 engaged by a slot 422 in the upper end of a right-hand arm of a sensing yoke 423. The yoke 423 straddles a corresponding zeroizing sensing yoke 424 (Figs. 29, 40, 41, and 42), both of said yokes being pivotally mounted on a rod 425 extending between the frames 62 and 63. A spring 426 urges the yoke 423 in a clockwise direction to normally maintain a rearwardly extending arm thereof in contact with a stud 427 secured in a sensing bar 428 for the right-hand column of indicator sets 386. The spring 426 is tensioned between a hook formed on a rearward extension of the yoke 423 and a corresponding hook formed on the sensing bar 428. A sensing bar 429 (Fig. 36), similar in every respect to the bar 428, is provided for the left-hand column of indicator sets 386, said sensing bars 428 and 429 being mounted for vertical shifting movement by means of parallel slots therein in cooperation with corresponding notches in rectangular bars 430 (Figs. 29 and 34) extending between the frames 62 and 63.

Each of the sensing bars 428 and 429 (Figs. 29, 34, and 36) has in the lower end thereof a notch engaged by corresponding flattened shifting bushings 431 and 432 rotatably mounted, respectively, on studs in an arm 433 and a lever 434, both of which are secured on a shaft 435 journaled in the frames 62 and 63. The lever 434 is operatively connected by a link 436 to a cam lever 437 free on the rod 86, said lever having rollers 438 and 439, which cooperate, respectively, with the peripheries of companion plate cams 440 and 441 secured on the main cam shaft 82 (see also Fig. 3).

Counter-clockwise revolution of the cams 440 and 441 rocks the levers 437 and 434 and the arm 433 first counter-clockwise and back to normal position to cause the sensing bars 428 and 429 to be first shifted downwardly and back to normal position, according to the time given in space 5 of the chart, Fig. 47. Downward sensing movement of the bar 428 (Figs. 29 and 41) permits the yoke 423, under influence of the spring 426, to rock clockwise in unison therewith to cause a sensing rod 442, extending between the arms of said yoke, to sense the forward control edges of five control bars 443 to 447 inclusive (Figs. 29, 32, 33, and 46) mounted for vertical shifting movement by means of parallel slots therein in cooperation with the bars 430.

The selecting bars 443 to 447 inclusive, for the right-hand column of indicator sets, are yoked to and operate in unison with corresponding control bars 448 to 452 inclusive for the left-hand column of indicator sets. For example, the companion bars 443 and 448 (Figs. 29, 32, and 33) have corresponding slots in the rearward edges thereof, engaged by studs 453 in similar arms of a yoke 454 free on a rod 455 supported by the frames 62 and 63.

The five vertical selecting bars 443 to 447 inclusive (Fig. 29) are operatively connected to corresponding horizontal selecting bars 458 to 462 inclusive (Figs. 24, 25, and 26), said vertical bars 443 to 447 in some cases being flexibly connected to the corresponding horizontal bars 458 to 462, and in other cases said horizontal bars being flexibly connected to the vertical bars 448 to 452 inclusive, said bars in turn being connected to the corresponding bars 443 to 447 by the yokes 454. For example, the vertical selecting bars 443, 445, and 447 for the right-hand column of indicator sets are directly connected to their corresponding horizontal selecting bars 459, 461, and 462, respectively, while the vertical selecting bars 444 and 446 are connected by the yokes 454 to their corresponding vertical selecting bars 449 and 451 in the left-hand group, said bars 449 and 451 in turn being connected to the corresponding horizontal selecting bars 458 and 459, respectively.

The connection between the vertical bar 447 and the corresponding horizontal bar 462 is best illustrated in Figs. 24 and 29, which will be explained in detail and used as representative of all the other horizontal and vertical bars.

Referring now to Figs. 24 and 29, the vertical selecting bar 447 has in the lower end thereof a slot 463 engaged by a stud 464 in an arm 465 free on a shaft 466 journaled in the frames 62 and 63 (Fig. 46). The arm 465 carries a stud 467, which is normally maintained in yieldable contact with a rearward extension of an arm 468, free on the shaft 466, by a spring 469 tensioned between said arms 465 and 468. A spring 473 normally maintains the forward edge of the arm 468 in yieldable contact with a leading rod 470 supported between arms 471 and 472 (Figs. 24, 29, and 46) secured on the shaft 466, said spring 473 being tensioned between a hook on said arm 468 and a rod 474 extending between forward extensions of the arms 471 and 472. Also secured on the shaft 466 is a crank 475 pivotally connected by a link 476 (Figs. 13 and 24) to the cam lever 180. The arm 468 carries a stud 477, which engages a vertical notch in the rearward end of the horizontal selecting bar 462 corresponding to the vertical bar 447, said bar 462 mounted for horizontal shifting movement by means of a slot in the rearward end thereof in cooperation with corresponding grooves in the bar 249 and by means of a corresponding groove in the rod 243, in cooperation with the forward end of said bar 462.

The two rows of selecting keys 239 (Figs. 2, 24, and 25) are shiftably mounted on their corresponding partition plates 242 by means of notches formed by bent-over portions on the upper edges of said partition plates and by means of studs 480 and 482 secured in the lower ends of said keys and extending through guide slots in the corresponding partition plates 242. Springs, not shown, urge the keys 239 upwardly to undepressed position. The left-hand row of selecting keys 239, A to N inclusive, each has on the lower end thereof a bent-over extension 479, which extends through matching guide slots in the partition plates 242 (Fig. 25) for the two rows of selecting keys. Likewise, each of the selecting keys O to Z inclusive, in the right-hand row, has on the lower end thereof a bent-over extension 481, which extends through a corresponding guide slot in the partition plate 242 for the left-hand row of selecting keys. The extensions 479 and 481 extend across the five horizontal selecting bars 458 to 462 inclusive (Figs. 24, 25, and 26) and cooperate with control projections 483 formed on the upper edges of said selecting bars. Fig. 26 shows, diagrammatically, the arrangement of all the extensions 479 and 481 in relation to the control projections 483 on the horizontal selecting bars 458 to 462, and said extensions may be identified with their corresponding selecting keys 239 by means of the letters of the alphabet immediately thereabove, which agree with like letters on said keys 239.

The horizontal selecting bars 458 to 462 inclusive have two positions; namely, a rearward or normal position, as shown in Figs. 24 and 29, and a forward or moved position. The cams 183 and 184 (Fig. 13), functioning according to the time given in space 3 of the time chart, Fig. 47, rock the lever 180, the crank 475 (Fig.

24), the shaft 466, and the arms 471 and 472 first clockwise and back to normal position. Normally the arms 465 and 468 are free to follow the rod 470 under influence of the springs 469 and 473 and, in so doing, carry the horizontal and vertical selecting bars 462 and 447 in unison with them. However, when certain of the selecting keys 239 are depressed, the A key, for example, the extension 479 thereon is moved into the path of corresponding projections 483 on the selecting bars 460, 461, and 462, thereby obstructing forward movement of these selecting bars, and, as a result, said selecting bars and the arms 465 and 468 remain stationary, while the leading rod 470 continues its movement without interruption.

As a more specific example, depression of the R key 239 (Figs. 2, 25, 26, 33, and 46) moves the extension 481 thereon into the paths of corresponding projections 483 on the selecting bars 460 and 461, to obstruct forward movement of said bars and the resulting downward movement of the companion vertical selecting bars 443 and 445 for the right-hand column of indicator sets. The other horizontal selecting bars 458, 459, and 462 are free to move forward, and their companion vertical selecting bars 444, 446, and 447 move downward in unison therewith.

By observing Figs. 33 and 50, it will be seen that the above positioning of the vertical selecting bars moves all of the corresponding high portions of the control surfaces thereof out of the path of the sensing rod 442 for the R indicator set, and, as a result, said rod is free to move rearwardly under influence of the sensing bar 428 when the latter moves downwardly under influence of the cams 440 and 441 (Figs. 34 and 36). Rearward or clockwise movement of the sensing rod 442 and the yoke 423, under action of the spring 426, causes the slot 422 (Figs. 40 and 42) in the right arm of said yoke 423, in cooperation with the stud 421, to rock said stud and the link 420 clockwise in unison therewith to engage said stud with a corresponding notch 484 in an engaging bar 485 for the right-hand column of indicator sets. The bar 485, together with a companion bar 486 (Fig. 27) for the left-hand column of indicator sets, is mounted for vertical shifting movement by means of parallel slots therein, in cooperation with the bars 430. The engaging bar 485 (Figs. 37 and 40) has in the lower end thereof a notch which engages a flattened bushing 487 free on a stud in an arm 488 secured on a shaft 489 journaled in the frames 62 and 63. The engaging bar 486 (Fig. 35) has in the lower end thereof a notch which engages a flattened bushing 490 free on a stud in an arm 491 secured on the shaft 489.

Also secured on the shaft 489 is a crank 492, having pivotally connected thereto the upper end of an add operating link 493, having a notch in the lower end adapted to engage a stud 494 in the rearward end of a cam lever 495 free on the rod 86. The cam lever 495 carries rollers 496 and 497, which cooperate with the peripheries of companion plate cams 498 and 499 secured on the main cam shaft 82 (see also Fig. 3). The link 493 (Figs. 35, 37, and 40) has a slot 500 engaged by a stud 501 in an arm 502 secured on the shaft 174. A rearward extension of the arm 491 has pivotally connected thereto the upper end of a link 503, the lower end of which has a notch 504 arranged to engage a stud 505 in the rearward end of a lever 506 free on the rod 86. The lever 506 carries rollers 507 and 508, which cooperate, respectively, with the peripheries of companion plate cams 509 and 510 secured on the main cam shaft 82. The link 503 has a slot 511 engaged by a stud 512 in the upper end of an arm 513 secured on the shaft 174, said arm being similar in every respect to the arm 502 for the link 493.

In adding operations, the notch in the link 493 is engaged with the stud 494 in the lever 495, as shown in Fig. 35. Consequently the add cams 498 and 499 will control the shifting movement of the engaging bars 485 and 486 according to the time given in space 6 of the time chart, Fig. 47. When the stud 421 (Fig. 40) is engaged with the notch 484 in the bar 485, which functions in unison with the companion bar 486, initial movement downwardly of said bars (Figs. 40, 43, and 46) rocks the arms 417 and 418 clockwise, causing the cam slots 419 therein, in cooperation with the shaft 390, to shift said shaft in a horizontal plane toward the rear to engage the gears 393 of the indicator set corresponding to the letter R with the actuator racks 361 after said racks have completed their initial movements under influence of the actuators 247 (Fig. 20) and have been positioned according to the number set up on the numeral keys 238 (compare spaces 1 and 6 of the chart, Fig. 47). Return downward movement of the racks 361 rotates the wheels 391 of the selected indicator set in an additive direction to enter therein the amount set up on the numeral keys 238.

After the racks 361 have completed their downward movement, the cams 498 and 499 return the bars 485 and 486 upwardly, to rock the arms 417 and 418 counterclockwise to cause the cam slots 419, in cooperation with the shaft 390, to return said shaft forwardly to disengage the gears 393 from the racks 361.

By referring to Fig. 13, it will be recalled that depression of the Minus bar 107 causes the camming surface 147 thereon to rock the lever 149 clockwise, which, through the link 169, rocks the arm 170 also clockwise to shift the link 175 downwardly to engage the stud 176 with the notch 177 in the lever 178 to connect said lever to the lever 173, which is secured to the shaft 174. Inasmuch as the lever 178 is connected by the link 179 to the cam lever 180, said lever and the lever 173 will operate according to the timing of the cams 183 and 184, as given in space 3 of the chart, Fig. 47, to rock said lever 173, the shaft 174, and the arms 502 and 513 (Figs. 35, 37, and 40) also clockwise, causing the studs 501 and 512 in the upper ends thereof, in cooperation with the slots in the links 493 and 503, to shift said links rearwardly or counter-clockwise to disengage the notch in the lower end of said link 493 from the stud 494 and to simultaneously engage the notch 504 in the lower end of the link 503 with the stud 505 in the lever 506.

Therefore, in minus operations, the bars 485 and 486 will move according to the timing of the cams 509 and 510, as given in space 7 of the chart, Fig. 47, to engage the wheels of the selected indicator set with the actuator racks, prior to initial movement of said actuator racks. Compare spaces 7 and 1 of the chart, Fig. 47. Therefore, in subtract operations, initial movement of the racks 361 rotates the wheels of the selected indicator set in a subtractive direction.

It will be recalled that minus or subtract operations are divided into two parts, a first part and a second part, and at the end of the first part the machine ceases operation to provide time for the operator to read the indicator sets. Near the end of the first part of a minus operation, the cams 509 and 510 (Fig. 40 and space 7, Fig. 47) return the bars 485 and 486 upwardly to temporarily disengage the wheels of the selected indicator sets from the actuator racks 361 and to move said indicator set forwardly into reading position to facilitate observation thereof by the operator. In the second part of a minus operation, and prior to return movement of the actuator racks 361, the cams 509 and 510 again engage the wheels of the selected indicator set with said racks, and, during return movement thereof, said wheels are restored to their original positions.

It will likewise be recalled that, in minus operations, either a number may be set up on the numeral keys 238 and subtracted from all the indicator sets, or one of the indicator sets may be selected by depression of the proper selecting key 239, for zeroizing, and the number cleared therefrom may be simultaneously subtracted from all the other indicator sets. In either type of operation, the machine comes to rest in the middle of the operation or after the first part has been completed, and, in the second part of either operation, the indicator sets are always restored to their original positions. It should also be remembered that in plus operations, when no selecting key 239 is depressed, all of the indicator sets are engaged with the vertical actuator racks, so that the number set up on the numeral keys will be simultaneously entered in all of said indicator sets.

The above-referred-to selecting of all the indicator sets for engagement with the actuator racks 360 and 361 is controlled by mechanism which positions the selecting bars 443 and 452 inclusive (Fig. 33) independently of the selecting keys 239, and said mechanism functions in adding or plus operations in the following manner.

The rearward ends of the horizontal selecting bars 458 to 462 (Figs. 3, 10, and 24) are transversed by a stud 516 secured in a bell crank 517 free on a stud 518 secured in the frame 62, said bell crank being urged counter-clockwise by a spring 519 to normally maintain said stud 516 in yielding engagement with the rearward end of said selecting bars 458 to 462. The bell crank 517 has pivotally connected thereto the lower end of a link 520, the upper end of which is slotted to receive a stud 521 in a pawl 522 free on a stud 523 secured in the frame 62. A spring 524, tensioned between the link 520 and the pawl 522, forms a yieldable connection between said parts.

When no selecting key 239 (Figs. 24, 25, and 26) is depressed, all of the horizontal selecting bars 458 to 462 are free to move forwardly under influence of the cams 183 and 184 (Fig. 13) and in so doing permit the stud 516 and the bell crank 517 to move counter-clockwise in unison therewith under influence of the spring 519. Counter-clockwise movement of the bell crank 517, through the link 520, rocks the pawl 522 also counter-clockwise to disengage said pawl from the shoulder on a control plate 525 mounted for horizontal shifting movement by means of a slot in the forward end thereof, in cooperation with a stationary stud 526 in the frame 62, and by means of a slot in the rearward end thereof, in cooperation with a bushing on a shaft 527 journaled in the frames 62 and 63 (see also Fig. 3).

The slot in the upper end of the link 520 (Fig. 10), the stud 521, and the spring 524 form a yieldable connection which permits the pawl 522 to be rocked counter-clockwise out of engagement with the shoulder on the plate 525 independently of said link 520 in minus operations in which a selecting key 239 has been depressed to select one of the indicator sets for zeroizing, as will be explained later.

The plate 525 (Figs. 11, 12, and 13) carries a stud 528, which cooperates with a camming surface on an arm 529 free on the shaft 527 and slotted to receive a stud 530 in the lever 178. The plate 525 (Figs. 11 and 29) has on the forward edge thereof a camming surface which cooperates with a roller 531 mounted on one arm of a yoke 532 free on a rod 533 extending between arms 534 and 535 (see also Fig. 3) secured on the shaft 527. A spring 536 urges the yoke 532 clockwise to normally maintain the roller 531 in yielding contact with the camming surface on the plate 525.

Initial movement clockwise of the lever 178 (Figs. 11, 12, and 13), under influence of the cams 183 and 184, rocks the arm 529 counter-clockwise to withdraw the camming surface thereon from the stud 528 to permit the spring 536 to rock the yoke 532 clockwise to cause the tooth-shaped forward edge 537 of the bail of said yoke to yieldingly engage upper and lower teeth 538 and 539 formed on the lower ends of the vertical selecting bars 443 to 452 inclusive (Fig. 33).

Also secured on the shaft 527 (Figs. 3, 11, and 29) is a crank 540 connected by a link 541 to a cam lever 542 free on the rod 86. The cam lever 542 carries rollers 543 and 544, which cooperate, respectively, with the peripheries of companion plate cams 545 and 546 secured on the main cam shaft 82.

Inasmuch as in the operation under discussion (plus) none of the selecting keys 239 (Fig. 24) has been depressed, and as a result all of the horizontal selecting bars 458 to 462 inclusive are free to move forwardly, and their corresponding vertical selecting bars 443 to 452 inclusive are also free to move downwardly in unison therewith, the cams 545 and 546 (Fig. 29), functioning according to the time given in space 4 of the chart, Fig. 47, rock the lever 542, the crank 540, the shaft 527, and the arms 534 and 535 counter-clockwise to shift the yoke 532 downwardly a slight distance to cause the edge 537 of said yoke to ratchet over the upper teeth 538 of the selecting bars 443 to 452 inclusive.

After the forward edge 537 of the yoke 532 has ratcheted over the upper teeth 538, continued rotation of the cams 545 and 546 moves said yoke upwardly to lift the vertical selecting bars 443 to 452 inclusive, independently of the horizontal selecting bars 458 to 462 inclusive (Figs. 33 and 49), to positions where low portions of the control surfaces on the forward edges thereof are opposite the sensing rods 442 for all of the indicator sets, so that, during sensing movement downwardly of the sensing bars 428 and 429, as explained in connection with Figs. 29, 34, and 36, the yokes 423 are free to move clockwise to engage the studs 421 of all the indicator sets with the corresponding notches in the engaging bars 485 and 486 (Figs. 35, 37, and 40). After this, functioning of the add cams 498 and 499 causes the engaging bars 485 and 486 to operate in adding time to engage and disengage the indicator sets with and from the vertical actuator racks 360 and 361 in adding or plus time, as explained previously.

By referring to Figs. 29 and 46, it will be noted that a yoke 547 is mounted between the arms 471 and 472 and secured in fixed relationship to said arms by the rod 470 and by a stud in each of said arms 471 and 472. The yoke 547 has an arcuate bail 548 with slots therein for receiving the lower ends of each of the arms 468 to space said arms properly in lateral relationship to each other. Likewise, the yoke 547 has secured thereto a cross member 549 having slots to receive the rearward ends of the arms 465 to space said arms properly in lateral relationship to each other.

From the foregoing description it will be understood that in plus operations, when no selecting key 239 (Figs. 1 and 2) is depressed, all of the indicator sets will be engaged with the vertical actuator racks so that the amount set up on the numeral keys 238 will be entered in all of said indicator sets.

*Minus operations*

As explained previously, there are two types of minus operations, one in which a number is set up on the numeral keys 238 and no selecting key 239 is depressed, and in this operation all of the indicator sets are engaged with the actuator racks to have said number subtracted therefrom. In the other type of minus operation, none of the numeral keys 238 is depressed, and a selecting key 239 is depressed to select the desired indicator set for zeroizing and all the other indicator sets are simultaneously selected for subtract or minus operation, so that the number on the zeroized indicator set will be subtracted therefrom. In either type of minus operation, the machine comes to rest in the middle of the operation, so that the operator may read the result of the difference between the number set up on the numeral keys and the number on the indicator sets, or the difference between the number in the zeroized indicator set and the numbers on the other indicator sets. In the second or final part of the minus operation, which is compulsory, all the indicator sets are returned or restored to their original positions.

In minus operations in which no selecting key 239 is effective, all of the horizontal selecting bars 458 to 462 inclusive (Figs. 24 and 26) are free to move forward to render the mechanism shown in Fig. 10 and explained above effective to release the lifting yoke 532 (Fig. 11). However, the mechanism shown in Fig. 10 does not function when any one of the selecting keys 239 is depressed to select one of the indicator sets for zeroizing. Therefore in this case it was necessary to provide mechanism which is rendered operative when the Minus bar 107 (Fig. 13) is depressed to release the yoke 532 for movement into engagement with the teeth 538 and 539 on the lower ends of the vertical selecting bars 443 to 452 inclusive (Fig. 33).

Depression of the Minus bar 107 (Figs. 11 and 13) causes the angular surface 147 thereon, in cooperation with the stud 148, to rock the lever 149 clockwise, which movement, through the link 169, rocks the arm 170 also clockwise to shift the link 175 downwardly to connect the lever 173 to the lever 178, which latter lever is operated by the cams 183 and 184 according to the time given in space 3 of the chart, Fig. 47. Initial movement of the cams 183 and 184 rocks the lever 173 clockwise, causing a stud 552 in the upper end thereof, in cooperation with a shoulder 553 on the pawl 522, to rock said pawl counterclockwise out of engagement with the shoulder on the plate 525, to release the yoke 532 for movement under influence of the mechanism shown in Fig. 12. The mechanism shown in Fig. 12 is actuated by clockwise movement of the lever 178, so that, in minus operations in which none of the selecting keys 239 is depressed, all of the vertical selecting bars 443 to 452 inclusive (Figs. 33 and 50) will be lifted in exactly the same manner as explained in connection with plus operations, to a position where low portions of the control surfaces of said racks are opposite the sensing rods 442, to connect the engaging mechanisms for said indicator sets with the engaging bars 485 and 486 (Figs. 35, 37, and 40), so that the number set up on the numeral keys 238 will be subtracted simultaneously from all the indicator sets.

*Control of zero latches in minus operations*

By referring to Fig. 16, it will be recalled that depression of both a numeral key 238 and a selecting key 239 shifts the locking bar 334 forward to move a slot 343 therein out of alinement with the stud 166 in the Minus bar 107, to prevent depression of this bar under these conditions.

In the type of minus operations in which one of the selecting keys 239 is depressed to select a certain one of the indicator sets for zeroizing, none of the numeral keys 238 is depressed; therefore, it is necessary to provide mechanism to release the zero latches in such operations, as it is necessary that the horizontal actuators 247 (Fig. 30) and the vertical racks 360 and 361 be free to function in such operations so that the number on the selected indicator set may be subtracted from the other indicator sets.

By referring to Fig. 24, it will be recalled that depression of one of the selecting keys 239 shifts the control plate 317 forwardly to rock the finger 335, the sleeve 336, and the arm 337 clockwise. Clockwise movement of the arm 337 (Fig. 21) shifts the pitman 339 forwardly to move a stud 554 carried thereby within operating range of the upper end of an arm 555 pivoted on a stud 556 in a bar 557 shiftably mounted by means of a slot in the rearward end thereof in cooperation with the shaft 82, and by means of a slot in the forward end thereof in cooperation with the stud 90 in the frame 64 (Fig. 3). A spring 559 urges the bar 557 forwardly to normally maintain a stud 560, carried thereby, in yielding engagement with the periphery of a shifting cam 561 secured on the main cam shaft 82. The lower end of the arm 555 is pivotally connected by a link 562 to the lower end of a bell crank 563, which, together with a companion bell crank of similar outline, is pivotally supported by studs 564 in the frames 64 and 61, said studs being in axial alinement with each other and also in axial alinement with the studs 257, which pivotally support the zero latches 256 (Fig. 20).

Depression of the Minus release bar 107 (Fig. 21) shifts the rearward end of the pitman 339 downwardly to move the stud 554 into the path of the upper end of the arm 555. Operation of the cam 561, according to the time given in space 12 of the chart, Fig. 47, shifts the bar 557 rearwardly to rock the arm 555 clockwise until the upper end thereof engages the stud 554, whereupon continued rearward movement of said bar 557 causes said arm 555 to reverse its direction of rotation to shift the link 462 rearwardly to rock the bell cranks 563 counterclockwise. Secured in the right-hand and left-hand bell cranks 563 is a rod 565 having secured thereto a plurality of bell cranks 566 free on the studs 257, which bell cranks in turn support a rod 567, which underlies all of the zero latches 256 for the numeral keys 238. Counterclockwise movement of the bell cranks 563 and 566 causes the rod 567 to engage the lower surfaces of the zero latches 256 and rock said latches counter-clockwise out of engagement with the blocks 259, to free the actuators 247 for movement under influence of the leading and restoring bar 355.

It is to be understood that the mechanism described above for releasing the zero latches does not function in plus operations, as it is necessary to depress the Minus release bar 107 in order to bring the stud 554 (Fig. 21) into alinement with the upper end of the arm 555.

By referring to Fig. 6, it will be recalled that, after the first part of a minus operation has been performed, the mechanism shown here restores the machine releasing mechanism to disengage the clutch mechanism shown in Fig. 7, and to restore the Minus bar 107 to undepressed position to terminate operation of the machine. From a comparison of spaces 11 and 12 of the chart (Fig. 47), it will be seen that, at the time the releasing mechanism is restored, the cam 561 also restores the mechanism shown in Fig. 21 to normal position, so that the stud 554 will move out of the path of the upper end of the arm 555 so as not to interfere with depression of the Minus bar 107 to initiate the second part of the minus operation. During the second part of the minus operation, after the Minus bar 107 has been depressed, the cam 561 again moves the zero latches 256 (Fig. 20) to ineffective position and retains said latches thus until the actuators 247 have been returned full distance forwardly to move the blocks 259 beyond the zero latches 256, so that, when the cam 561 releases said latches, they will latch over said blocks to obstruct rearward movement of said actuators 247. The zero latches 256 are moved to ineffective positions in the second part of minus operations, so that the blocks 259 will not have to by-pass or ratchet underneath said latches, thereby relieving strain on the actuators 247 and the actuator restoring mechanism.

*Zeroizing mechanism*

It will be recalled that each of the indicator sets is provided with a zero stop mechanism which is selectively controlled by the selecting keys 239, said mechanism including stop plates 394 (Figs. 42 and 43) secured on each of the indicator wheels 391, and corresponding stop pawls 395 carried by the yokes 396. This selectively controlled stop mechanism is actuated by the sensing mechanism, including the sensing bars 428 and 429 (Figs. 29 and 36), and is controlled by the selecting bars 443 to 452 inclusive (Fig. 33).

The zero stop mechanism will be explained in connection with the indicator set shown in Figs. 42 and 43, which set is identified by the letter R and is selected by the R selecting key 239.

The left-hand arm of the yoke 396 (Figs. 41, 42, and 43) has a slot which engages a stud 569 in a crank 570 secured on a shaft 571 free in a bushing in the frame 62 (Fig. 46). Also secured on the shaft 571 is an arm 572 slotted to embrace a stud 573 in a downwardly extending arm of the yoke 424 pivoted on the rod 425 inside the arms of the yoke 423 (Fig. 41). A spring 574 urges the yoke 424 clockwise to normally maintain incurved surfaces on the right and left arms thereof in contact with the rod 442, which is supported by the sensing yoke 423.

Clockwise movement of the yoke 423 and the rod 442, under influence of the sensing bars 428 and 429 (Figs. 29 and 36), as explained above, permits the yoke 424 to move in unison therewith to cause the rearward edge of the bail 575 of said yoke to sense the control surfaces on the vertical selecting bars 443 to 447 inclusive. In all operations (except minus operations in which one of the indicator sets is selected for zeroizing), a high portion of the control surfaces of one or more of the selecting bars is always presented to the bail 575 of said yoke 424, and, as a result, the zero stop pawls 395 (Figs. 42 and 43) are retained in their ineffective positions as shown here.

Depression of the R selecting key 239 (Figs. 2 and 26) moves the extension 481, carried by said key, into the path of projections on the horizontal selecting bars 460 and 461, to obstruct forward movement of said bars while the other three bars, 458, 459, and 462, are free to move forwardly under influence of the mechanism shown in Figs. 13 and 24, and in the manner explained hereinbefore. The horizontal selecting bars 460 and 461 control, respectively, the vertical selecting bars 443 and 445 (Figs. 33 and 50), and consequently said bars remain in their upward positions while the other three vertical bars move downwardly in unison with their corresponding horizontal bars.

After the selecting bars 443 to 447 have thus been positioned, the mechanism shown in Figs. 11, 13, and 29 functions to cause the forward edge 537 of the bail of the yoke 532 to engage, respectively, the upper teeth 538 on the vertical selecting bars 444, 446, and 447 (Fig. 33) and to engage the lower teeth 539 on the selecting bars 443 and 445.

Operation of the cams 545 and 546 (Fig. 29) then causes the yoke 532 to lift the vertical selecting bars 443 to 447 inclusive upwardly to a position where low portions of the control surfaces of said bars are opposite the bail 575 of the sensing yoke 424 and low portions of said control surfaces are also opposite the sensing rod 442 of the yoke 423, as shown in Fig. 51. Inasmuch as low portions of the control surfaces of the vertical selecting bars are opposite both the rod 442 and the bail 575, the yoke 424 is free to move full distance clockwise in unison with said yoke 423, under influence of the spring 574, to rock the arm 572, the shaft 571, and the crank 570 counter-clockwise, causing the stud 569 to rock the yoke 396 and the zero stop pawls 395 clockwise. Clockwise movement of the zero stop pawls 395 (Figs. 42 and 43) moves said pawls to the positions shown in dot-and-dash lines in Fig. 42, in which they are in the paths of the teeth of the zero stop plates 394 secured to each of the wheels 391 for the indicator set shown here.

Clockwise movement of the yoke 423 (Figs. 40 and 41) causes the stud 421 to be rocked into engagement with the notch 484 in the engaging bar 485, and, as this is a minus operation, the cams 509 and 510 control the movement of said engaging bar to cause the gears 393 to be engaged with the corresponding actuator racks 361 prior to their initial movement. Initial movement upwardly of the actuator racks 361 (Figs. 20, 22, and 42) causes the wheels 391 of the R indicator set to be reversely rotated—that is, in a counter-clockwise direction—until the zero stop teeth on the plates 394 contact the zero stop pawls 395 to locate said wheels in zero position and to position the actuator racks 361 in accordance with the number standing on said wheels.

The final positioning of the vertical selecting bars 443 to 452 inclusive, under influence of the mechanism shown in Fig. 29, brings low portions of the control surfaces of said bars opposite the sensing rods 442 in the yokes 423 for all the other indicator sets, to cause the wheels of said indicator sets to be engaged with the actuator racks 360 and 361 prior to their initial movements upwardly so that, while the R indicator set is being zeroized, said wheels will be rotated in a subtractive direction to subtract therefrom the number which is temporarily cleared from said R indicator set.

After the selected indicator set has been zeroized and the number thereon has been subtracted from all the other indicator sets, the first part of the subtract operation is completed, and the machine comes to rest to give the operator opportunity to read the wheels of the indicator sets. The second part of the minus operation is initiated by the operator's again depressing the Minus release bar 107, and, in the second part of said operation, all the indicator sets remain in engagement with the actuator racks 360 and 361, and return movement of the actuator mechanism under influence of the restoring bar 355, causes said racks to restore the indicator sets to their original positions.

Fig. 50 is a diagrammatic view showing the relative positions of the vertical selecting bars 443 to 447 inclusive and the sensing rod 442 and the bail 575 in their first movement, in which the bars 444, 446, and 447 are moved downwardly, while the bars 443 and 445 remain stationary under influence of the depressed selecting key 239 (Fig. 24) for the R indicator set.

Fig. 51 shows in diagrammatic form the relation of the vertical selecting bars 443 to 447 inclusive to the rod 442 and the bail 575 after said vertical selecting bars have been raised from the positions shown in Fig. 50 by the mechanism shown in Fig. 29, to cause low portions of the control surfaces thereof to be positioned opposite the bail 575 and the rod 442 for the R indicator set, to cause said set to be zeroized in the manner explained above and the number therein to be simultaneously subtracted from all the other indicator sets.

Fig. 50 also shows the relative positions of the vertical selecting bars and the bail 575 and the rod 442 in plus operations, in which the R selecting key 239 is depressed to select the R indicator set for addition, in the manner explained earlier herein.

Fig. 49 is a diagrammatic view showing the relative positions between the vertical selecting bars 443 to 447 inclusive and the sensing rod 442 and the sensing bail 575 in plus and minus operations in which none of the selecting keys 239 (Fig. 24) is depressed, and in which operations all of the indicator sets are selected for adding, if the operation is a plus operation, and are selected for subtracting if the operation is a minus operation. It will be noted that, in the examples shown in Figs. 49 and 50, high portions of the control surfaces of certain of the selecting bars obstruct movement of the bail 575 to prevent zeroizing of any of the indicator sets in these two examples.

*Clearing mechanism*

As explained previously, clearing operations are initiated by depression of the Clear bar 108 (Figs. 2, 4, and 6), which initiates an operation of the machine in which all of the indicator sets are simultaneously zeroized in preparation for a succeeding computing operation.

Depression of the Clear starting bar 108 (Figs. 6, 7, and 48) causes the stud 164, in cooperation with the surface 146 of the lever 125, to rock said lever clockwise against the action of the spring 126, causing the bent-over extension 127 on said lever to rock the pawl 100 counter-clockwise out of engagement with the square stud 103 to release the slide 97 and the lever 95 to the action of the spring 104, which immediately rocks said lever counter-clockwise to permit the switch arm 130 to close the switch contacts to initiate machine operation.

Likewise, depression of the Clear bar 108 (Figs. 7 and 9) shifts the bar 207 downwardly to move the hook-shaped extension 230 thereon into the path of the stud 229 to obstruct counter-clockwise releasing movement of the arm 89 and the clutch arm 85 to insure that the main clutch mechanism is not disengaged in clear operations.

Downward movement of the bar 207 (Fig. 9) moves the obstructing surface 208 beyond the stud 209 so that the arm 195 is free to move counter-clockwise in unison with the arm 191 to release the pawl 196 to the action of the spring 200, so that said pawl will engage the clutch ratchet 201, which is integral with the crown gear 202, said gear being driven by the train of gearing shown in Fig. 3. The pawl 196 connects the disk 198 and the gear 211 to the ratchet 201 for movement in unison therewith, said gear 211, through the train of gearing shown in Fig. 4, including gears 212, 214, and 216, driving the auxiliary or clear cam shaft 98 in a clockwise direction to effect a clearing operation. When the clear cam shaft 98 nears the end of one clockwise revolution, the cam 220 (Fig. 6), cooperating with the roller 221, restores the slide 97 rearwardly to disengage the clear clutch mechanism and to terminate machine operation in the manner explained earlier herein.

The timing of the restoring cam 220 (Fig. 6) is given in space 15 of the chart, Fig. 47.

Secured on the cam shaft 98 (Figs. 3, 29, and 31) are companion plate cams 577 and 578, which cooperate, respectively, with rollers 579 and 580 secured on a cam lever 581 in turn secured on a shaft 582 journaled in hubs in the frames 62 and 63. A stud in the rearward end of the lever 581 supports bushings 583 and 584, which are flattened to engage, respectively, notches in the clear shifting bar 412 for the right-hand group of indicator sets (Fig. 46) and a companion bar 585 for the left-hand group of indicator sets, said bars being mounted for vertical shifting movement, respectively, by means of parallel slots therein in cooperation with studs 586 and 587 (Fig. 3), secured, respectively, in the frames 62 and 63. The bar 412 has therein a notch 588 (Figs. 29, 31, and 46) engaged by a stud 589 in a crank 590 secured on a shaft 591 journaled in the frames 60 and 62, said shaft 591 being for the R set of indicators. The shaft 591 has secured thereon an alining pawl 592 and a zero stop pawl 593 for each of the five indicator wheels 391.

Normally, when the indicator shaft 390 is in disengaged position, the alining pawls 592 engage the teeth of the gears 393, as shown in Figs. 30 and 27, to aline the indicator wheels 391 in set positions. Horizontal engaging movement of the indicator shaft 390, to engage the gears 393 with the actuator racks, disengages the teeth of said gears from the pawls 592.

In clearing operations, it will be recalled that the main cam shaft 82 is rendered inoperative, and consequently there is no horizontal or engaging and disengaging movement of the indicator shaft 390, and said shaft remains in its forward or disengaged position, as shown here. Rotation of the cams 577 and 578 (Figs. 3, 29, and 30) causes the bars 412 and 585 to be shifted upwardly and downwardly, according to the time given in space 13 of the chart, Fig. 47. Initial movement upwardly of the bar 412, near the beginning of a clearing operation, causes the notch 588, in cooperation with the stud 589, to rock the shaft 591 counter-clockwise to move the alining pawls 592 and the zero stop pawls 593 from the positions shown in full lines in Fig. 30 to the positions shown in dot-and-dash lines, where said alining pawls will be out of the path of the teeth of the gears 393, and where said zero stop pawls 593 will be in the paths of corresponding stop studs 594 in the gears 393.

Initial movement upwardly of the bar 412 (Figs. 43, 44, and 45) causes the notch formed by bent-over ears thereof, cooperating with the stud 411, to rock the bell crank 408 clockwise, which movement, by means of the stud 407 in said bell crank, in cooperation with the annular groove in the drum 406, shifts said drum and the indicator shaft 390 axially toward the right, as viewed here, to aline the shoulders 413 in said shaft 390 with the corresponding pawls 415 carried by each of the indicator wheels 391.

The gear 216 (Fig. 4), secured on the clear cam shaft 98, meshes with a gear 595 free on a stud 596 in the frame 60, said gear 595 in turn meshing with a gear 597 (see also Fig. 3) secured on a short shaft 598 journaled in a hub in the right frame 60 and in a bracket 606 secured to said frame 60. Also secured on the short shaft 598 are companion plate cams 599 and 600, which cooperate respectively with rollers 601 and 602 (Fig. 28) in a cam arm 603 free on a stud 604 in the right frame 60. The arm 603 is connected in fixed relationship to a lever 605 by a hub extending therebetween, and by the stud which supports the roller 601. The lever 605 carries in the forward end thereof a stud which rotatably supports a bushing 607, flattened surfaces of which engage a notch in the lower end of the resetting rack 403 for the right-hand group of indicator sets (see also Fig. 46), which, as explained previously, has thereon resetting teeth engaged by the pinions 402 secured on the right-hand ends of each of the shafts 390 for the right-hand group of indicator sets.

After the zero stop pawls 593 (Fig. 30) have been moved into the paths of the studs 594, the clearing rack 403 is shifted downwardly by the cams 599 and 600 according to the time given in space 14 of the time chart, Fig. 47. This movement of the rack 403 rotates the pinion 402 and the shaft 390 counter-clockwise, causing the shoulders 413 in said shaft (Figs. 44 and 45), in cooperation with the teeth 414 of the pawls 415, to restore the wheels 391 to zero position, which position is determined by the studs 594 contacting the zero stop pawls 593 (Fig. 30). After the wheels of the indicator sets have been restored to zero position, the bar 412 (Fig. 31) is restored downwardly to normal position to shift the indicator shaft 390 toward the left to normal position, as shown in Figs. 43, 44, and 45, to move the shoulders 413 out of the path of the teeth 414 of the pawls 415, so as not to interfere with clockwise or additive movement of said wheels 391.

After the bar 412 (Fig. 31) has been restored downwardly to normal position, the cams 599 and 600 (Fig. 28) return the rack 403 upwardly to normal position, as shown here, and said rack, in returning to normal position, rotates the shaft 390 clockwise also to normal position. The bar 412 (Figs. 30 and 31), in its downward return movement, also moves the pawls 592 and 593 from the positions shown in dot-and-dash lines to the positions shown in full lines, so that the alining pawls 592 will again engage the gears 393 to aline the indicator wheels 391 in zero position.

By observing Figs. 43 and 46, it will be noted that the pinion 402, which is secured on the right-hand end of the shaft 390 and which engages the teeth of the rack 403, is wide enough to permit the axial shifting of the shaft 390, as explained above, without becoming disengaged from the teeth in said rack 403. It is, therefore, evident that, when the indicator shaft 390 is in disengaged position, said shaft is held stationary by the pinion 402 in cooperation with the rack 403, and that, when said indicator shaft is in engaged position or shifted rearwardly, the teeth of the pinion 402 are engaged with the corresponding alining tooth 404 on the bar 405 (Fig. 28) to hold said shaft 390 against rotational movement when the wheels of the indicator sets are engaged with the actuator racks.

By referring to Figs. 3 and 4, it will be seen that the clear cam shaft 98 has secured on the left-hand end thereof a gear 608, which meshes with a gear 609 free on a stud in the frame 61, said gear 609 in turn meshing with a gear 610 secured on a short shaft 611 journaled in a hub in the frame 61, in exactly the same manner as the shaft 598. Also secured on the shaft 611 are companion plate cams 612 and 613, similar in every respect to the cams 599 and 600 and having similar connections to a restoring rack 614 (Fig. 46) for the left-hand group of indicator sets for resetting said indicator sets in exactly the same manner as explained for the right-hand indicator sets.

Secured on the right-hand end of the shaft 98 (Fig. 4) is a homing cam 615, which cooperates with a roller 616 on the left-hand end of a lever 617 free on a stud 618 secured in the frame 60. A spring 619, tensioned between the right-hand end of the lever 617 and a stationary stud, urges said lever clockwise, causing the roller 616, in cooperation with the cam 615, to assist the auxiliary or clear cam shaft 98 to home position and to retain said shaft in home position after the clutch mechanism shown here has been disengaged.

The main cam shaft 82 is also provided with a homing cam 620 (Figs. 3 and 38), which cooperates with a roller 621 carried by a lever 622 free on the rod 86. A spring 623 urges the lever 622 clockwise, causing the roller 621, in cooperation with the periphery of the cam 620, to urge the main cam shaft 82 to each of its two positions and to yieldingly retain said shaft in either of its two positions. It will be understood that the two homing surfaces of the cam 620 are necessary because in the first part of minus operations the main cam shaft 82 makes approximately one-half revolution, after which the machine ceases operation to permit observation of the indicator sets, and in the second parts of minus operations said cam shaft 82 completes its revolution.

EXPLANATION OF OPERATION

Operation of the machine chosen to illustrate the present invention is not in any sense complicated or difficult to understand, and said machine may be used in any manner desired in the comparing of various numbers and in obtaining various digital values. Therefore it is believed unnecessary to outline any particular system of operation in connection therewith, but, instead, the functions of the machine and the method of operating it will be outlined in a general manner. This may involve, to a certain extent, repetition of statements previously made.

The machine embodying the present invention has twenty sets of indicators arranged in two vertical columns or groups, each group comprising ten indicator sets. The indicator sets are selected for engagement with the machine actuators by means of two rows of selecting keys, each row containing ten keys, corresponding keys and indicator sets being identified by identical, alphabetical notations. For example, the A selecting key 239 (Fig. 1) selects the A set of indicators for engagement with the actuators, and the Z selecting key selects the Z set of indicators for engagement with the actuators, and so on. Each indicator set has five denominational wheels, which correspond to the five denominational rows of numeral keys 238 (Fig. 1), said indicator wheels having on the face thereof numerals from 0 to 9, which are visible through apertures in the cabinet.

In the present adaptation, the indicator sets are not provided with transfer mechanisms. As a result, there is no transferring of tens digits from lower denominations to higher denominations, and therefore there is no accumulation of totals in the same sense as it is known in the accounting machine field. The numeral keys control the positioning of the actuators for the wheels of the indicator sets and thereby cause numbers that are set up thereon to be entered in said indicator sets.

The machine in its present form is capable of two types of plus operations, two types of minus operations, and a clearing operation, said plus operations being initiated by depression of the Plus release bar 106 and said minus operations being initiated by depression of the Minus release bar 107, and the clearing operations being initiated by depression of the Clear release bar 108.

In one type of plus operation, a desired number is entered in a selected one of the indicator sets, and this is accomplished by setting up the number on the numeral keys, depressing the proper selecting key, and then depressing the Plus release bar to initiate machine operations. In the ensuing machine operation, the number set up on the numeral keys is entered additively in the selected indicator set. In the other type of plus operation, a desired number is simultaneously entered in all of the indicator sets, and this is accomplished by setting up the number on the numeral keys and without depressing any of the selecting keys, operation of the machine being initiated by depression of the Plus release bar. During this operation, the number set up on the keyboard is entered additively in all of the indicator sets.

In the first type of minus operation, a desired number is simultaneously entered subtractively in all the indicator sets, and this is effected by setting up the number on the numeral keys and, without depressing a selecting key 239, initiating machine operation by depression of the Minus release bar 107. In the operation which follows, the number set up on the numeral keys is simultaneously entered subtractively in all of the indicator sets. All minus operations are divided into two parts, and, during the first part of the minus operation under discussion, the number set up on the numeral keys is subtracted from all of the indicator sets, as explained immediately above, after which the machine ceases operation to permit the operator to read the results of the computation. The second part of the minus operation is initiated by again depressing the Minus release bar, and, during the second part of said operation, all of the indicator sets are restored to their original positions.

In the second type of minus operation, no number is set up on the numeral keys, but any desired one of the indicator sets is selected for zeroizing by depression of the proper selecting key and initiating machine operation by depression of the Minus release bar. During the first part of this operation, the indicator set corresponding to the depressed selecting key is zeroized and the number thereon is simultaneously subtracted from the other nineteen indicator sets, after which the machine comes to rest to provide time for the operator to read the results of the computation. The second part of the minus operation is initiated by again depressing the Minus release bar, and, during this second part of the operation, all the indicator sets are restored to the positions in which they were just prior to the beginning of the minus operation.

The second part of all minus operations is enforced by a locking mechanism which locks the Plus release bar and the Clear release bar against depression until after the Minus release bar has been depressed a second time.

A clearing operation, in which all twenty of the indicator sets are simultaneously cleared or zeroized, is initiated by depressing the Clear release bar. This is the only manner in which the indicator sets of the present machine may be cleared, for, as the machine is presently constructed, the selecting keys cannot be used in conjunction with the Clear release bar.

In the present adaptation of the machine, no provision has been made for subtractively entering numbers in selected ones of the indicator sets by use of the selecting keys in conjunction with the numeral keys. In fact, such operations are prevented by an interlocking mechanism which prevents depression of the Minus release bar when both numeral keys and selecting keys are depressed.

While no particular system of operation has been outlined in connection with the machine embodying the present invention, it is believed that the above explanation of operation will give a thorough understanding of the functions and capabilities of said machine.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, having a plurality of indicator sets to receive and display numbers, the combinaton of operable control elements corresponding to each of the indicator sets; means, including control devices and sensing means to sense the control devices, and controlled by the control elements to cause the corresponding indicator set to be selected for the reception of numbers; and means rendered effective when no control element is operated to control the causing means to cause all the indicator sets to be selected for the reception of numbers.

2. In a machine of the class described, having a plurality of storage sets and means to set up numbers to be entered in the storage sets, the combination of actuators controlled by the setting up means to enter numbers in said storage sets; means to engage and disengage the storage sets and the actuators; operable control elements corresponding to each storage set; selecting means controlled by the control elements to cause the storage set corresponding to the operated control element to be connected to the engaging and disengaging means, whereby the number on the setting up means will be entered in said storage set; and means rendered operative when no control element is operated to control the selecting means to cause all the storage sets to be connected to the engaging and disengaging means, whereby the number on the setting up means will be entered in all the storage sets.

3. In a machine of the class described, having a plurality of storage sets for the receiving and displaying of numbers, the combination of means, including actuators, to enter numbers in the storage sets; means to engage and disengage the storage sets and the actuators; means to connect the storage sets to the engaging and disengaging means; control elements corresponding to the various storage sets; selecting members to control the effectiveness of the connecting means; means to impart one movement to the selecting members to cause said members to be positioned under influence of the control elements to effectuate the connecting means for the storage set corresponding to the effective control element; and means to impart another movement to the selecting members to effectuate the connecting means for all of the storage sets.

4. In a machine of the character described, having a plurality of indicator sets arranged to receive and display numbers, the combination of means, including actuators, to enter numbers in the indicator sets; means to engage and disengage the indicator sets and the actuators; means to select the various indicator sets for connection to the engaging and disengaging means; means to control the selecting means to cause any desired indicator set to be connected to the engaging and disengaging means; and means effective when the above controlling means is ineffective to control the selecting means to cause all of the indicator sets to be connected to the engaging and disengaging means.

5. In a machine of the character described, having a plurality of indicator sets arranged to receive and display numbers, the combination of means, including actuators, to enter numbers in the indicator sets; means to engage and disengage the indicator sets and the actuators, said indicator sets normally disconnected from the last-named means; means to connect each of the indicator sets to the engaging and disengaging means; positionable means to render the various connecting means effective; means to control the positionable means to cause the connecting means for any desired indicator set to be rendered effective; and means effective when the above controlling means is ineffective, to control the positionable means to cause the connecting means for all the indicator sets to be rendered effective.

6. In a machine of the character described, having a plurality of storage sets arranged to store numbers for reference purposes, the combination of means, including actuators, to enter numbers in the storage sets; means to engage and disengage the indicator sets and the actuators, said storage sets normally disconnected from the last-named means; means to select the various indicator sets for connection to the engaging and disengaging means; means to sense the selecting means to connect the various indicator sets to the engaging and disengaging means; operable control elements to control the selecting means to cause the sensing means to connect any desired storage sets to the engaging and disengaging means; and means effective when no control element is operated to control the selecting means to cause the sensing means to connect all of the indicator sets to the engaging and disengaging means.

7. In a machine of the character described having a plurality of registers and means including actuators to enter numbers in said registers for display and reference purposes, the combination of means to engage and disengage the registers and the actuators; means positionable in two directions to select the various registers for connection to the engaging and disengaging means; means to control the positioning of the selecting means in one direction to cause any desired register to be connected to the engaging and disengaging means; and means to control the positioning of the selecting means in another direction to cause all of the registers to be simultaneously connected to the engaging and disengaging means.

8. In a machine of the character described having a plurality of registers arranged to receive numbers for reference purposes, the combination of actuators to enter numbers in the registers; numeral elements to control the positioning of the actuators; means to engage and disengage the registers with and from the actuators, said registers normally disconnected from said means; a set of control slides; feelers coacting with the slides to select the various registers for connection to the engaging and disengaging means; control elements corresponding to the various registers to control the setting of the slides to select any desired register to be connnected to the engaging and disengaging means; and other means to control the setting of the slides to cause all of the registers to be connected to the engaging and disengaging means.

9. In a machine of the character described having a plurality of indicator sets for receiving numbers, the combination of actuators to enter numbers in the indicator sets; numeral elements to control the actuators; means to engage and disengage the indicator sets with and from the actuators; movable selecting means to connect the indicator sets to the engaging and disengaging means; means to move the selecting means in one direction; means corresponding to the various indicator sets to control the movement of the selecting means in said one direction to cause any desired indicator set to be connected to the engaging and disengaging means; and means to move the selecting means in another direction to cause all of the indicator sets to be connected to the engaging and disengaging means.

10. In a machine of the character described having a plurality of indicator sets for receiving numbers, the combination of actuators to enter numbers in the indicator sets; numeral elements to control the actuators; means to engage and disengage the indicator sets with and from the actuators; movable selecting means to connect the indicator sets to the engaging and disengaging means; means to move the selecting means in one direction; control elements corresponding to each of the indicator sets and operable to control movement of the selecting means in said one direction to cause any desired indicator sets to be connected to the engaging and disengaging means; and means effective when no control element is operated to move the selecting means in another direction to cause all of the indicator sets to be connected to the engaging and disengaging means.

11. In a machine of the class described having a plurality of indicator sets and means, including actuators, to enter numbers in said sets for display purposes, the combination of means to engage and disengage the indicator sets and the actuators; means to connect the engaging and disengaging means to each indicator set; selecting members; control surfaces on the selecting members; sensing means cooperating with the control surfaces to effectuate the connecting means; means to move the selecting members in relation to the sensing means in one direction; control elements corresponding to the various indicator sets and operable to control the selecting members when moved in said one direction to position the control surfaces relatively to the sensing means to effectuate the connecting means for any desired indicator set; and means effective when no control element is operated, to move the selecting members in another direction to position the control surfaces in relation to the sensing means to effectuate the connecting means for all of the indicator sets.

12. In a machine of the class described having a plurality of registers arranged to receive numbers for reference and display purposes, said machine capable of difference computing operations in which one of the registers is zeroized and the number therein simultaneously subtracted from all the other registers, the combination of actuating means for the registers; means to connect the registers to the actuating means; zero stop means for each of the registers; means to effectuate the zero stop means; movable selecting members to control the operation of the connecting means and the effectuating means; control elements corresponding to the various registers to control one movement of the selecting members to initiate a condition which will later cause the effectuating means to effectuate the zero stop means for the register corresponding to the effective control element; and means rendered effective in difference computing operations to impart a second movement to the selecting members to complete the above initiated condition to cause the effectuating means to effectuate the zero stop means for the selected register and to cause said selecting members to control the connecting means to cause all of the registers to be connected to the actuating means, whereupon the selected register is zeroized and the number therein simultaneously subtracted from all the other registers.

13. In a machine of the character described having a plurality of registers arranged to receive numbers for reference purposes, said machine capable of difference computing operations in which one register is zeroized and the number therein simultaneously entered negatively in all the other registers, the combination of operable numeral elements to set up numbers to be entered in the registers; actuating means for the registers, said means controlled by the operable elements to enter numbers in said registers, and controlled by any selected register to negatively transfer the number in said selected register to the other register; means to connect the registers to the actuating means; means to control the connecting means to cause the registers to be connected to the actuating means in add or subtract timing; zero stop means for the registers; means to effectuate the zero stop means; positionable selecting members to control the operation of the connecting means and to control the operation of the effectuating means; control elements corresponding to the various registers, said control elements operable to control the initial positioning of the selecting members to set up a condition which will later cause the effectuating means to effectuate the zero stop means for any selected register; and means effective in difference computing operations to impart a final positioning movement to the selecting members to complete the condition previously set up to cause the effectuating means to effectuate the zero stop means for the selected register and to cause said selecting members to control the connecting means to cause all of the registers to be connected to the actuating means, whereupon the selected register is zeroized and the number therein simultaneously entered negatively in all the other registers.

14. In a machine of the character described having a plurality of indicator sets, each set comprising a plurality of denominational elements to receive and display numbers, said machine capable of difference computing operations in which one indicator set is zeroized and the number therein simultaneously entered negatively in all the other indicator sets, the combination of operable numeral elements for setting up numbers to be entered in the indicator sets; actuating means for the indicator sets, said actuating means controlled by the operable numeral elements to enter numbers in the indicator sets, and controlled by any selected indicator set to negatively transfer the number in said set to all the other indicator sets; means to engage and disengage the indicator sets with and from the actuating means; means to control the operation of the engaging and disengaging means to cause the indicator sets to be engaged with and disengaged from the actuators in positive or negative timing; means to connect the different indicator sets to the engaging and disengaging means; zero stop means for each indicator set; means to effectuate the zero stop means; selecting members having an initial positioning movement and a final positioning movement to control the connecting means and the effectuating means; operable control elements corresponding to the various indicator sets to control the initial positioning of the selecting members to set up a condition which will later cause the effectuating means to effectuate the zero stop means for any selected one of the indicator sets; and means effective in difference computing operations to impart the final positioning movement to the selecting members to complete the condition previously set up to cause the effectuating means to effectuate the zero stop means for the selected indicator set and to cause said selecting members to control all of the connecting means to cause all the indicator sets to be connected to the actuating means, whereby the selected indicator set is zeroized and the number therein simultaneously entered negatively in all the other indicator sets.

15. In a machine of the class described having a plurality of indicator sets, each comprising a plurality of denominational elements to receive numbers, said machine capable of plus and minus operations to enter positive and negative numbers in the indicator sets, and capable of difference computing operations in which one indicator set is zeroized and the number therein simultaneously entered negatively in all the other indicator sets, the combination of operable numeral elements to set up numbers to be entered in the indicator sets; actuating means for the indicator sets, said actuating means controlled by the numeral elements to enter positive or negative numbers in said indicator sets and controlled in difference computing operations by any selected indicator set to negatively transfer the number therein to all the other indicator sets; means to engage and disengage the indicator sets and the actuators; means to operate the engaging and disengaging means in positive or negative timing; means to connect the indicator sets to the engaging and disengaging means; zero stop means for each indicator set; selecting numbers having an initial positioning movement and a final positioning movement; control surfaces on the selecting members; sensing means cooperating with the control surfaces to render the zero stop means and the connecting means effective; operable control elements corresponding to each of the indicator sets to control the initial positioning of the selecting members to set up a condition which will later cause the control surfaces to be positioned in proper relationship to the sensing means; and means effective in difference computing operations to impart the final positioning movement to the selecting members to cause the control surfaces to be positioned in proper relationship to the sensing means to cause the zero stop means for any selected indicator set to be effectuated and to cause the connecting means for all the indicator sets to be effectuated, whereby the selected indicator set is zeroized and the number therein simultaneously entered negatively in all the other indicator sets.

16. In a machine of the class described having a plurality of indicator sets for displaying numbers, said machine capable of operations to enter positive or negative numbers in said indicator sets, and capable of difference computing operations in which a selected indicator set is zeroized and the number therein simultaneously transferred negatively to all the other indicator sets, the combination of means to initiate difference computing operations; operable numeral elements to set up numbers to be entered in the indicator sets; actuators for the indicator sets, said actuators controlled by the numeral elements to enter positive or negative numbers in the indicators sets and controlled in difference computing operations by any selected indicator set to negatively transfer the number therein to all the other indicator sets; means to engage and disengage the indicator sets and the actuators; means to connect the indicator sets to the engaging and disengaging means; means rendered effective by the initiating means to cause the engaging and disengaging means to function in subtract timing; zero stop means for each indicator set; a plurality of selecting members having an initial selecting movement and a final selecting movement to control the effectiveness of the connecting means and the zero stop means; operable control elements corresponding to each indicator set to control the initial selecting movement of the selecting members to set up a condition which will later cause the zero stop means for any selected indicator set to be effectuated; and means rendered effective by the initiating means to impart the final selecting movement to the selecting members to cause the zero stop means for the selected indicator set to be rendered effective and to simultaneously cause the connecting means for all the indicator sets to be rendered effective to connect all said indicator sets to the actuating means so that the selected indicator set will be zeroized and the number therein simultaneously transferred negatively to all the other indicator sets.

17. In a machine of the character described having a plurality of storage sets for receiving numbers, said machine capable of plus and minus operations to enter positive or negative numbers in the indicator sets and also capable of difference computing operations in which a selected indicator set is zeroized and the number therein simultaneously subtracted from all the other indicator sets, the combination of means to initiate difference computing operations; actuating means for the indicator sets; means normally effective to latch the actuators in home position; operable numeral elements to release the latching means and to control the positioning of the actuating means to enter numbers in the indicator sets, said actuating means also controlled in difference computing operations to zeroize a selected indicator set and simultaneously subtract the number therein from the other indicator sets; means to engage and disengage the indicator sets and the actuating means; means rendered effective by the initiating means to cause the engaging and disengaging means to function in subtract timing; means to connect each of the indicator sets to the engaging and disengaging means; zero stop means for each of the indicator sets; selecting members having an initial positioning movement and a final positioning movement for controlling the connecting means and the zero stop means; control elements corresponding to each indicator set and operable to control the initial positioning of the selecting members to set up a condition which will later cause the zero stop means for the indicator set corresponding to the operated control element to be rendered effective; means rendered effective by the initiating means to impart the final positioning movement to the selecting members to cause the zero stop means for the selected indicator set to be rendered effective and to simultaneously cause the connecting means for all the indicator sets to be effectuated to connect all the indicator sets to the actuating means; and means rendered effective by the joint action of the initiating means and the control elements to unlock the latches to free the actuators for positioning under influence of the selected indicator set, to cause said selected indicator set to be zeroized and the number therein simultaneously subtracted from all the other indicator sets.

18. In a machine of the character described having a plurality of registers arranged to receive numbers for reference and display purposes, said machine capable of plus and/or minus operations in which numbers are entered positively and/or negatively in said registers, the combination of means, including actuators, to enter numbers in the registers; means to engage and disengage the registers and the actuators; means to connect each of the registers to the engaging and disengaging means; means to initiate plus operations in which the engaging and disengaging means is operated in plus timing to cause positive numbers to be entered in the registers; means to initiate minus operations in which the engaging and disengaging means is operated in minus timing to cause negative numbers to be entered in the registers; positionable selecting members to control the connecting means; operable control elements corresponding to each of the registers to position the selecting members to cause the corresponding connecting means to be rendered effective; other means to position the selecting members to cause all the connecting means to be rendered effective; means normally effective to disable the other positioning means; means effectuated by the selecting members in plus operations and, when no control element is operated, to render the disabling means ineffective to cause a plus number to be entered in all the registers; and means effectuated by the minus initiating means to render the disabling means ineffective to cause all the registers to be connected to the actuators whereby a negative number is entered in all the registers.

References Cited in the file of this patent

UNITED STATES PATENTS

| | | |
|---|---|---|
| 1,197,276 | Ellis | Sept. 5, 1916 |
| 1,203,863 | Ellis | Nov. 7, 1916 |
| 1,260,704 | Pierce | Mar. 26, 1918 |
| 2,055,703 | Perkins | Sept. 29, 1936 |